US009191109B2

(12) United States Patent
Zbinden et al.

(10) Patent No.: US 9,191,109 B2

(45) Date of Patent: Nov. 17, 2015

(54) TRANSPORTING DATA AND AUXILIARY SIGNALS OVER AN OPTICAL LINK

(71) Applicant: SAMTEC, INC., New Albany, IN (US)

(72) Inventors: Eric Zbinden, Sunnyvale, CA (US); Thomas Benjamin Troxell, San Jose, CA (US); Ashraf M. Wahba, Hayward, CA (US); David Daniel Stark, Fremont, CA (US); David A. Langsam, Sunnyvale, CA (US)

(73) Assignee: SAMTEC, INC., New Albany, IN (US)

( * ) Notice: Subject to any disclaimer, the term of this patent is extended or adjusted under 35 U.S.C. 154(b) by 189 days.

(21) Appl. No.: 13/671,168

(22) Filed: Nov. 7, 2012

(65) Prior Publication Data

US 2013/0129360 A1 May 23, 2013

Related U.S. Application Data

(60) Provisional application No. 61/562,371, filed on Nov. 21, 2011.

(51) Int. Cl.

| | |
|---|---|
| ***H04B 10/08*** | (2006.01) |
| ***H04B 17/00*** | (2015.01) |
| ***H04B 10/00*** | (2013.01) |
| ***H04B 10/25*** | (2013.01) |
| ***H04B 10/40*** | (2013.01) |
| ***H04B 10/079*** | (2013.01) |
| ***H04B 10/077*** | (2013.01) |

(52) U.S. Cl.

CPC .......... *H04B 10/2503* (2013.01); *H04B 10/077* (2013.01); *H04B 10/0799* (2013.01); *H04B 10/40* (2013.01)

(58) Field of Classification Search

CPC ................................ H04B 10/00; H04B 10/24

USPC ......... 398/22, 25, 33, 27, 135, 136, 137, 138, 398/139

See application file for complete search history.

(56) References Cited

U.S. PATENT DOCUMENTS

| | | | | |
|---|---|---|---|---|
| 6,362,905 | B1 * | 3/2002 | Fukashiro | H04B 10/032 398/82 |
| 8,781,332 | B2 * | 7/2014 | Tang | H04B 10/40 385/88 |
| 2002/0073258 | A1 * | 6/2002 | Riley | G06F 13/105 710/105 |
| 2002/0123350 | A1 * | 9/2002 | Bui | H04L 43/50 455/450 |
| 2003/0212830 | A1 * | 11/2003 | Greenblat | G06F 15/78 709/251 |
| 2005/0228920 | A1 * | 10/2005 | Shah | G06F 13/24 710/267 |
| 2006/0018664 | A1 * | 1/2006 | Levinson | H04B 10/6911 398/135 |
| 2007/0009018 | A1 * | 1/2007 | Wang | H04L 25/0272 375/222 |
| 2007/0180281 | A1 * | 8/2007 | Partovi | G06F 13/4072 713/320 |
| 2009/0086798 | A1 * | 4/2009 | Zukunft | H04L 12/10 375/222 |

(Continued)

*Primary Examiner* — Shi K Li

*Assistant Examiner* — Pranesh Barua

(74) *Attorney, Agent, or Firm* — Keating & Bennett, LLP

(57) ABSTRACT

A data transport system for transporting data and auxiliary signals over an optical link comprises a transmitter, a receiver and an optical link. The transmitter and receiver are coupled to a first end of the optical link. The optical link includes a number of optical channels. A controller is coupled to the transmitter and the receiver, and controls the transmitter and the receiver to operate in a first state when data are detected at an input of the transmitter. Data are transported via the data transport system in the first state. The controller controls the transmitter and the receiver to operate in a second state when the data are detected as absent at the input of the transmitter. Data are prevented from being transported via the data transport system in the second state.

48 Claims, 9 Drawing Sheets

(56) References Cited

U.S. PATENT DOCUMENTS

2009/0196604 A1* 8/2009 Grann .................... G09G 5/003 398/41
2009/0279889 A1* 11/2009 Kirkpatrick ...... H04B 10/25752 398/41
2010/0316386 A1* 12/2010 Luk .................... H04B 10/2587 398/93
2011/0022750 A1* 1/2011 Sobelman ........... H04L 25/0262 710/100
2012/0082463 A1* 4/2012 Kasprzyk ............... H04B 10/40 398/140

* cited by examiner

TRANSPORTING DATA AND AUXILIARY SIGNALS OVER AN OPTICAL LINK

RELATED APPLICATION

This application claims the benefit of U.S. patent application Ser. No. 61/562,371, filed Nov. 21, 2011.

This application is related to U.S. patent application Ser. No. 12/059,981, filed May 8, 2008, and published as US Patent Publication Number US 2009/0279889 A1.

TECHNICAL FIELD

The disclosure herein relates generally to network architectures and, more particularly, to optical communication links.

BACKGROUND

Many protocols are used to communicate information among digital devices. For example, various protocols and systems have been developed for communications among central processing units and associated chip sets, as well as with peripheral devices, such as network interface cards, storage adaptors, graphics cards, and other devices. One protocol which has been developed for transporting computer bus protocols is the Peripheral Component Interconnect Express (PCIe) protocol. The PCIe protocol provides for a high bandwidth, serialized, full-duplex, point-to-point data communication link that is generally used to connect central processing units (CPUs) and chipsets with peripheral devices, for example. The Peripheral Component Interconnect Special Interest Group (PCI-SIG) defines the specifications for compliance to the PCIe standards.

PCIe systems provide point-to-point full duplex data lanes, and a single link may comprise from 1 to 32 lanes, for example. The data rate on each lane is determined by the characteristics of that electrical connection. The connection characteristics are reflected in the PCIe specification and provide for data rates of 2.5 gigabits per second (Gb/s) per lane, PCIe Gen 2 provides data rates of 5.0 gigabits per second per lane, and PCI Gen 3 provides data rates of 8 gigabits per second per lane. In a typical computer system each slot carries one, two, four, eight, or sixteen lanes of data between a motherboard and an associated card, usually plugged into a socket on the motherboard. Additionally, PCIe has a provision for external cabling.

The PCIe system provides a set of supporting auxiliary signals, including a clock lane and signals for system control, such as reset, hot plug, and power management, in support of the data lanes. The PCIe system also incorporates a state machine that controls the state of the link, such as the data rate of the lanes, the link width, the power level of the link, and other factors.

Optical communication links are used in numerous technologies including Fibre Channel, InfiniBand, and 10 Gigabit Ethernet (10 GbE), to name a few. U.S. patent application Ser. No. 12/059,981 (the '981 application), filed May 8, 2008 (US Patent Publication Number US 2009/0279889 A1), describes systems and method for implementing the optical transport of PCIe protocol information over an optical link that is a bundle of optical fibers. The systems and methods of the '981 application include a PCIe interface that both transmits and receives data and auxiliary signals (also referred to as sideband signals) over an optical link. The interface receives PCIe data signals from a data processing unit and provides those data signals to an optical link for conversion (from electrical to optical signals) and transmission to a remote data processing unit or other similar apparatus. The system has N datapath lanes dedicated for transmission of data, and N datapath lanes dedicated for reception of data, where each transmission lane and each reception lane is coupled to a separate optical fiber. Additionally, as the PCIe protocol provides for the dedicated auxiliary signals and protocol used to communicate information required for PCIe optical link management, the interface includes a link controller that interfaces the auxiliary signals to the transceivers, which transport the auxiliary signals over the optical link using two dedicated fibers of the optical link. Consequently, while this technology provides for the transport of data and auxiliary signals over an optical link, the optical link is typically required to have some number (e.g., at least two) of optical fibers or channels dedicated to the transport of the auxiliary signals, in addition to the optical channels dedicated to data transport.

Another issue that arises when implementing particular protocols (e.g., PCIe, Serial Attached Small Computer System Interface (SCSI) (SAS), etc.) over optical links is that these protocols may use the absence of data on a channel to indicate a valid state of the protocol. Therefore, when the absence of data, referred to as electrical idle or quiet period, is used as a signaling protocol for exchanging information or for reducing power consumption, it becomes necessary for the optical system components to accurately transmit and receive this state. This can lead to issues in optical systems, however, because of typical optical system configurations. For example, the lower cutoff frequency inherent in an optical fiber channel leads to more noise energy being present on the channel in the absence of data. The increased channel noise energy is aggravated by the typical receiver amplifier gain configuration, which can increase the receiver gain during times when no data is being transmitted, and the insufficient automatic squelch speeds. The result is that the typical optical system, during electrical idle periods, amplifies and outputs the only signal present on the channel, random noise. Therefore, the implementation over an optical link of any protocol that relies on electrical idle or quiet periods dictates accurate electrical idle state detection and control.

INCORPORATION BY REFERENCE

Each patent, patent application, and/or publication mentioned in this specification is herein incorporated by reference in its entirety to the same extent as if each individual patent, patent application, and/or publication was specifically and individually indicated to be incorporated by reference.

DETAILED DESCRIPTION

Figure 1:
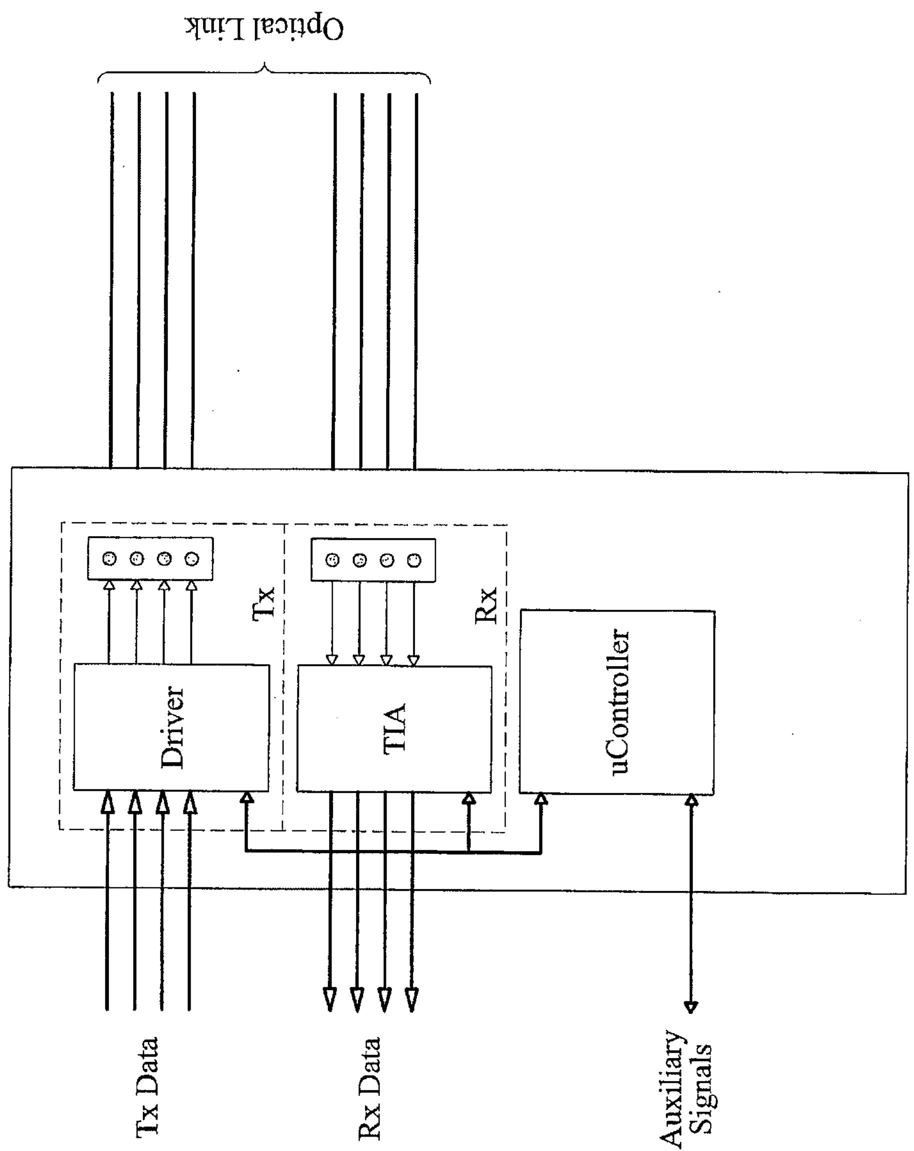
FIG. 1 is a block diagram of an optical transceiver module, under an embodiment.

Systems and methods are described that include an interface device comprising a transmitter and a receiver coupled to an optical link made up of a specified number of optical channels or fibers. The interface device is also referred to herein as an optical transceiver or transceiver. The transceiver is used for example to form a data transport system that includes one of the transceivers coupled to at least one end of the optical link so that it controls the input and output and hence the transport of data over the optical link. The transceiver also includes or couples to a transceiver microcontroller that controls operation of both the transmitter and receiver between a first state and a second state. The first state is a data state in which only data are transported over the optical link, and the second state is an auxiliary state in which only auxiliary signals (e.g., status and control signals) are transported over the optical link using the same channels that are used for data transport.

The transceiver microcontroller controls the transmitter and the receiver to operate in the first state when a first signal configuration is detected among a set of auxiliary signals, where the first signal configuration comprises a first code represented by combined states of the auxiliary signals that indicates the data transport system is properly configured to transport the data. The transceiver microcontroller controls the transmitter and the receiver to operate in the second state when a second signal configuration is detected among the auxiliary signals, where the second signal configuration comprises a second code represented by the combined states of the auxiliary signals that indicates the data transport system is improperly configured to transport the data. Accordingly, the transceiver microcontroller multiplexes transport of the auxiliary signals with transport of the data in order to transport the auxiliary signals as encoded signals over the optical link during times when data is not being transported over the optical link. Moreover, the data transport system of an embodiment includes circuitry to accurately detect and preserve the integrity of electrical idle states.

The data and the auxiliary signals of an embodiment are compatible with a Peripheral Component Interconnect Express (PCIe) protocol, but are not so limited. The PCIe protocol provides for dedicated auxiliary signals (also referred to as sideband signals) to provide system-level features and improved performance. These auxiliary signals can enable the PCIe systems to be hot-pluggable and safely removed, as well as supporting the various clock architectures. The auxiliary signals are described in detail herein.

In the following description, numerous specific details are introduced to provide a thorough understanding of, and enabling description for, embodiments of the data transport system and methods. One skilled in the relevant art, however, will recognize that these embodiments can be practiced without one or more of the specific details, or with other components, systems, etc. In other instances, well known structures or operations are not shown, or are not described in detail, to avoid obscuring aspects of the disclosed embodiments.

FIG. 1 is a block diagram of an optical transceiver module, under an embodiment. The optical transceiver module, also referred to herein as a transceiver, is used as a component in a data transport system that includes the auxiliary signal multiplexing of an embodiment, and provides a subsystem for implementing computer bus protocols over an optical link. For example, the transceiver is used to form a data transport system that includes one of the transceivers coupled to each end of an optical link so that it controls the input and output and hence the transport of data over the optical link. The optical link can comprise any desired material, but in an embodiment is a bundle or group of optical fibers. The information transported to/from the interface via the optical link can be sent and received using separate fibers, or multiplexed onto one fiber. Furthermore, the optical link can comprise optical waveguides. While the optical link described herein as an example includes a 4-channel full-duplex optical link, the embodiment is not so limited as the optical link may include any number of channels as appropriate to a configuration of the data transport system.

The transceiver both transmits and receives information over the optical link and, as such, comprises a transmitter and a receiver. The transmitter of an embodiment comprises one or more channels, and each channel includes a driver. One or more data lines or cables are coupled to the transmitter and as the data input for the channels provide electrical signals at the input of each driver. One or more light-emitting devices are coupled between the output of each driver and a corresponding optical channel to which the driver output is coupled, where the optical channels collectively form a first set of optical channels. The light-emitting devices include, for example, lasers, electron-stimulated devices, electroluminescent devices, solid-state lighting (SSL) devices, semiconductor light sources, light-emitting diodes (LEDs), organic light-emitting diodes (OLED), polymer light-emitting diodes (PLED), and other light-emitting devices as appropriate to a configuration of the transmitter. The drivers and the light-emitting devices perform an electrical-to-optical (EO) conversion of the electrical signals received at the transmitter input, and output or transmit the corresponding optical signals over the first set of optical channels.

The receiver of an embodiment comprises one or more photodetectors or photosensors, and an input of each photodector is coupled to an optical fiber or channel of the optical link over which optical signals are received. The optical fibers coupled to the photodetectors collectively form a second set of optical fibers or channels of the optical link. A transimpedance amplifier (TIA) is coupled between the output of each photodetector and one or more data lines or cables that transport electrical signals output by the TIA. A limiting amplifier may be coupled to an output of a TIA, but the embodiment is not so limited. The photodetectors and the TIAs perform an optical-to-electrical (OE) conversion of the optical signals received at the receiver input, and output or transmit the corresponding electrical signals via the receiver output. The first and second sets of optical fibers or channels make up the optical link.

The transceiver includes or couples to a transceiver microcontroller, which also may be referred to as a microcontroller. The transceiver microcontroller is coupled to and controls the operating states of the transmitter and the receiver. When using a signaling or bus protocol that includes auxiliary signals (e.g., status and control) in addition to data, like the PCIe protocol for example, the transceiver microcontroller enables the transceiver to transport the auxiliary signals over the same channels of the optical link that are used for data transport. Thus, the transceiver microcontroller enables the transport of both data and auxiliary signals over the same optical channels without the need for separate signal channels for the auxiliary signals. In so doing, the transceiver microcontroller of an embodiment controls the operating states of the transmitter and receiver between a first state and a second state in response to a signal configuration of auxiliary signals transported over the data transport system.

The first state of an embodiment, which is a data state in which data are transported over the optical link, is commanded by the transceiver microcontroller in response to detecting a first signal configuration encoded in the auxiliary signals. The first signal configuration is also referred to herein as the terminal state, and is described in detail herein. The second state, which is an auxiliary state during which auxiliary signals (e.g., status and control signals) are exclusively transported over the optical link, is commanded by the transceiver microcontroller in response to detecting a second signal configuration encoded in the auxiliary signals. Thus, the transceiver microcontroller integrates or multiplexes transport of the auxiliary signals with transport of the data in order to transport the auxiliary signals as encoded signals over the optical link during times when data is not being transported over the optical link.

Figure 2A:
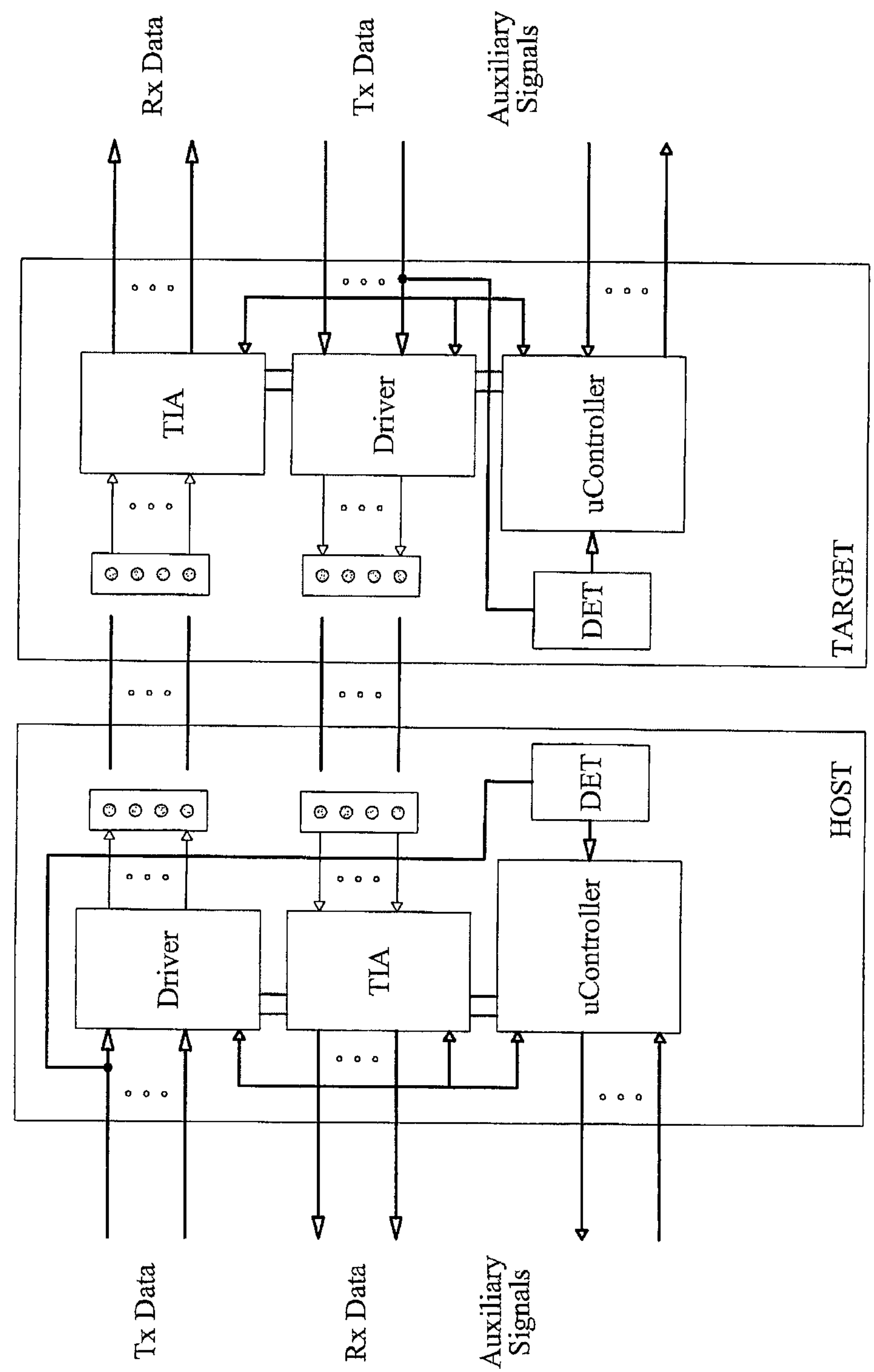
FIG. 2A is a block diagram of an optical interface system that includes a first optical transceiver module coupled to a first end of an optical link and a second optical transceiver module coupled to a second end of an optical link with auxiliary signal management, under an embodiment.

FIG. 2A is a block diagram of an optical interface system that includes a first optical transceiver module coupled to a first end of an optical link and a second optical transceiver module coupled to a second end of an optical link with auxiliary signal management, under an embodiment. The first and second optical transceiver modules may alternatively be referred to as the host transceiver and the target transceiver, respectively. In this embodiment, each transceiver incorporates or uses the auxiliary signal multiplexing described herein. The optical link of an embodiment can comprise any desired material, but in an embodiment is a bundle of optical fibers. The information transported to/from the interface via the optical link can be sent and received using separate fibers, or multiplexed onto one fiber. The optical link comprises any number of optical fibers or channels as appropriate to a configuration of a data transport system that includes the first and second optical transceiver modules.

The host transceiver both transmits and receives information over the optical link and, as such, comprises a host transmitter and a host receiver. The host transmitter comprises one or more channels, and each channel includes a driver. One or more data lines or cables are coupled to the host transmitter input and provides electrical signals at the input of each driver. One or more light-emitting devices are coupled between the output of each driver and a corresponding optical channel to which the driver is coupled, where the optical channels coupled to the drivers of the host transmitter collectively form a first set of optical channels. The drivers and the light-emitting devices perform an EO conversion of the electrical signals received at the host transmitter input, and output or transmit the corresponding optical signals over the first set of optical channels. The host receiver comprises one or more photodetectors or photosensors, and an input of each photodector is coupled to an optical fiber or channel of the optical link over which optical signals are received. The optical fibers coupled to the photodetectors collectively form a second set of optical fibers or channels of the optical link. A TIA is coupled between the output of the photodetector and one or more data lines or cables that receive electrical signals output by the TIA. A limiting amplifier may be coupled to an output of a TIA, but the embodiment is not so limited. The photodetectors and the TIAs perform an OE conversion of the optical signals received at the host receiver input, and output or transmit the corresponding electrical signals via the host receiver output.

A host transceiver microcontroller of the host transceiver is coupled to and controls the operating states of the host transmitter and host receiver, and the host transceiver microcontroller enables the optical link to transport both the data and the auxiliary signals between the host transceiver and the target transceiver without the need for separate or dedicated channels for the auxiliary signals. In so doing the host transceiver microcontroller, acting as the auxiliary signal interface for the host transceiver, receives the auxiliary signals. The received auxiliary signals comprise a first set of auxiliary signals received from the host and a second set of auxiliary signals received from the target via the optical link. The host transceiver microcontroller determines the collective signal configuration of the received auxiliary signals and, based on the collective signal configuration, controls the operating states of the host transmitter and host receiver between a first state and a second state. The first state, which is a data state in which data are exchanged between the host transceiver and the target transceiver via the optical link, is commanded by the host transceiver microcontroller in response to detecting a first signal configuration encoded in the auxiliary signals. The second state, which is an auxiliary state in which auxiliary signals (e.g., status and control signals) are exchanged between the host transceiver and the target transceiver via the optical link, is commanded by the host transceiver microcontroller in response to detecting a second signal configuration encoded in the auxiliary signals. Additionally, the host transceiver microcontroller controls the host transmitter to encode the first set of auxiliary signals received from the host for transmission via the optical link to the target, and disables the output of the host receiver while in the auxiliary state.

The target transceiver also transmits and receives information over the optical link using a target transmitter and a target receiver. The target transmitter comprises one or more channels, and each channel includes a driver. One or more data lines or cables are coupled to the target transmitter input and thus the channels, and provides electrical signals at the input of each driver. One or more light-emitting devices are coupled between the output of each driver and a corresponding optical channel to which the driver is coupled, where the optical channels coupled to the drivers of the target transmitter collectively form the second set of optical channels. The drivers and the light-emitting devices perform an EO conversion of the electrical signals received at the target transmitter input, and output or transmit the corresponding optical signals over the second set of optical channels. The target receiver comprises one or more photodetectors or photosensors, and an input of each photodector is coupled to an optical fiber or channel of the optical link over which optical signals are received. The optical fibers coupled to the photodetectors collectively form the first set of optical fibers or channels of the optical link. A TIA is coupled between the output of the photodetector and one or more data lines or cables that receive electrical signals output by the TIAs. A limiting amplifier may be coupled to an output of a TIA, but the embodiment is not so limited. The photodetectors and the TIAs perform an OE conversion of the optical signals received at the target receiver input, and output or transmit the corresponding electrical signals via the target receiver output.

A target transceiver microcontroller of the target transceiver is coupled to and controls the operating states of the target transmitter and target receiver, and the target transceiver microcontroller enables the optical link to transport both the data and the auxiliary signals between the target transceiver and the host transceiver without the need for separate or dedicated channels for the auxiliary signals. In so doing the target transceiver microcontroller, acting as the auxiliary signal interface for the target transceiver, receives the auxiliary signals. The received auxiliary signals comprise a first set of auxiliary signals received from the host transceiver via the optical link and a second set of auxiliary signals received from the target. The target transceiver microcontroller determines the collective signal configuration of the received auxiliary signals and, based on the collective signal configuration, controls the operating states of the target transmitter and target receiver between a first state and a second state. The first state, which is a data state in which data are exchanged between the host transceiver and the target transceiver via the optical link, is commanded by the target transceiver microcontroller in response to detecting a first signal configuration encoded in the auxiliary signals. The second state, which is an auxiliary state in which auxiliary signals (e.g., status and control signals) are exchanged between the host transceiver and the target transceiver via the optical link, is commanded by the target transceiver microcontroller in response to detecting a second signal configuration encoded in the auxiliary signals. Additionally, the target transceiver microcontroller controls the target transmitter to encode the first set of auxiliary signals received from the target for transmission via the optical link to the host transceiver, and disables the output of the target receiver while in the auxiliary state.

The system of an embodiment further includes idle detection circuitry, as described in detail herein. The idle detection circuitry includes a detector that is coupled between the input of a channel driver and the transceiver microcontroller. Generally, the detector measures a parameter of the channel driver input signal, and outputs a detector signal representative of the parameter. While the detector of an embodiment is described and shown herein as a discrete component it is not so limited, and in one or more embodiments the detector can be integrated into the TIA and driver and/or other components of the data transport system.

The transceiver microcontroller uses the detector signal to determine whether a data signal is present at the corresponding channel driver input. When the transceiver microcontroller determines that no data signal is present at the channel driver input it outputs a transmitter output disable control that disables the output of the transmitter drivers. While the transmitter driver outputs are disabled by the microcontroller, however, the corresponding driver remains active. Thus, the transceiver microcontroller controls the transmitter driver outputs so that when the driver input signal at the corresponding channel does not include data the driver output is turned off and no light is transmitted on that optical channel to the corresponding receiver.

The idle detection circuitry and transmitter output disable control work together with an internal squelch circuit of the TIA (referred to herein as the TIA squelch) to reduce or eliminate the transmission of noise by the data transport system. Each TIA of the receiver includes a squelch circuit that detects the light level of signals received over a corresponding channel of the optical link and disables the output of that channel when the detected light level on that channel is below a pre-specified threshold level. Thus, when any TIA of the corresponding receiver fails to detect light on a corresponding optical channel, that TIA determines that data is not present on the optical channel and, in response, squelches its output with the internal squelch circuitry to avoid a situation where noise signals are output by the receiver in the absence of data.

In addition to the internal squelch of each TIA, the microcontroller of an embodiment includes a receiver output disable control by which the microcontroller controls the output of each TIA so that the output of each TIA is selectively enabled and disabled by the microcontroller to control the output of data or signals received at the input of the corresponding channel of the TIA. Again, while the microcontroller can selectively enable and disable the output of each TIA, the TIAs remain in an active (on) state.

The data transport system of an embodiment uses the transmitter output disable, the receiver output disable, and the TIA squelch to provide a system with multiple operational states. The operational states of an embodiment include an auxiliary state, a data-active state, and a data-idle state, as described in detail herein, but the embodiment is not so limited. In the auxiliary state, the transceiver transmitter outputs are selectively enabled/disabled as appropriate to generate the optical pattern or code representing the auxiliary signal states, the transceiver receiver outputs are disabled, and the TIA squelches of each receiver channel are selectively enabled/disabled according to signals transmitted on that channel by a corresponding transmitter, and the transceiver transmitter inputs are not monitored for the presence of data. In the data-active state, the transceiver transmitter outputs are enabled, the transceiver receiver outputs are enabled, the TIA squelch of each receiver channel is disabled, and the transceiver transmitter inputs are monitored for the presence of data. In the data-idle state, the transceiver transmitter outputs are disabled, transceiver receiver outputs are enabled, the TIA squelch of each receiver channel is enabled, and the transceiver transmitter inputs are monitored for the presence of data. Transitions between the auxiliary state, the data-active state, and the data-idle state are described in detail herein.

Figure 2B:
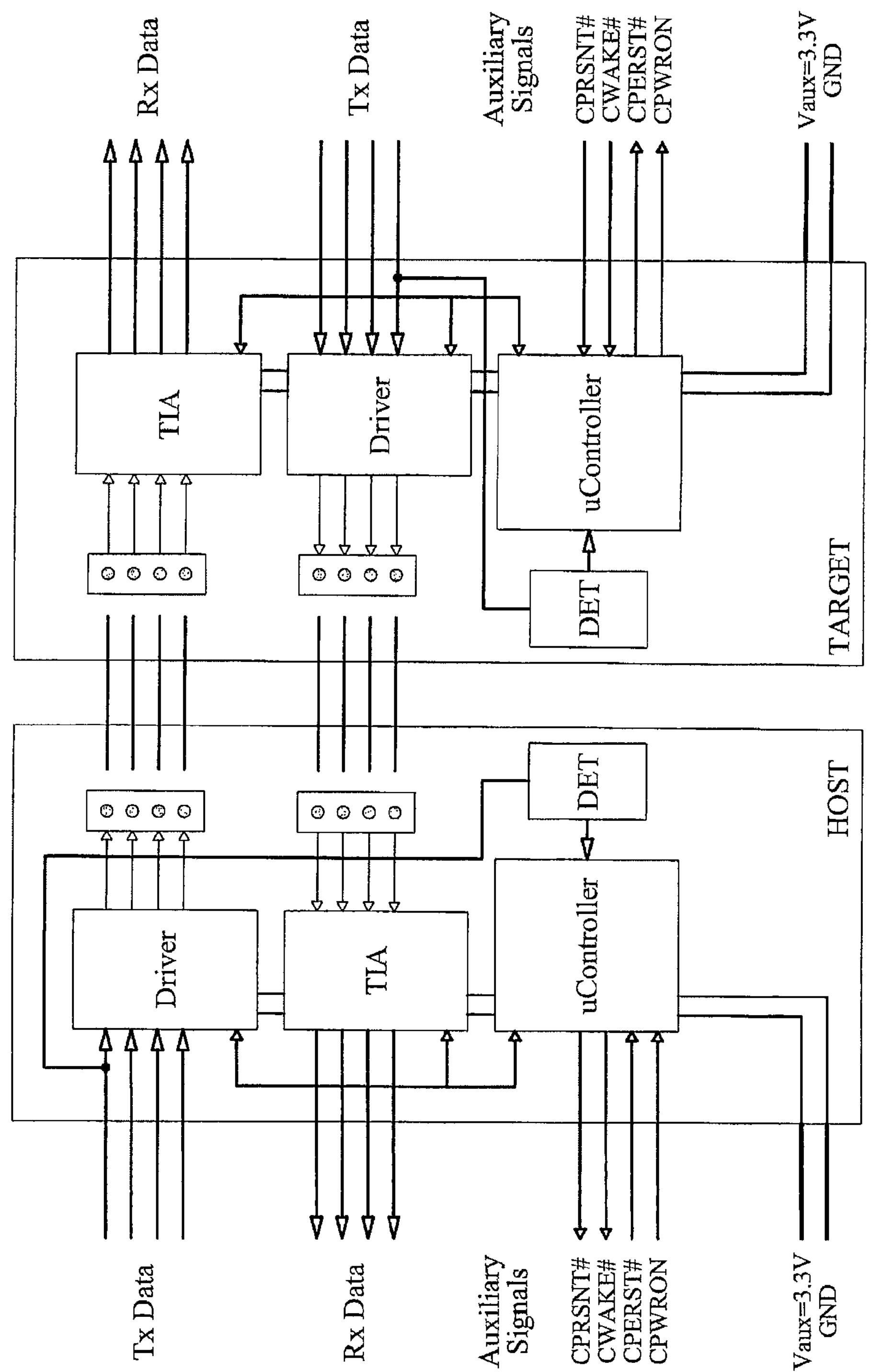
FIG. 2B is a block diagram of an example configuration of an optical interface system that includes a first optical transceiver module coupled to a first end of an optical link and a second optical transceiver module coupled to a second end of an optical link with auxiliary signal management, and idle detection circuitry, under an embodiment.

As a more specific example of the data transport system configuration of an embodiment that includes the transmitter output disable control, the receiver output disable control, and the TIA squelch, FIG. 2B is a block diagram of an example configuration of an optical interface system that includes a first optical transceiver module coupled to a first end of an optical link and a second optical transceiver module coupled to a second end of an optical link with auxiliary signal management, and idle detection circuitry, under an embodiment. The first and second optical transceiver modules may alternatively be referred to as the host transceiver and the target transceiver, respectively. In this embodiment, each transceiver incorporates or uses the auxiliary signal multiplexing described herein. The optical link of an embodiment can comprise any desired material, but in an embodiment is a bundle of optical fibers. The information transported to/from the interface via the optical link can be sent and received using separate fibers, or multiplexed onto one fiber. Furthermore, the optical link can comprise optical waveguides. While the optical link described with reference to this example includes a 4-channel full-duplex optical link, the embodiment is not so limited as the optical link may include any number of channels as appropriate to a configuration of the data transport system.

The host transceiver both transmits and receives information over the optical link and, as such, comprises a host transmitter and a host receiver. The host transmitter comprises one or more channels, and each channel includes a driver. One or more data lines or cables are coupled to the host transmitter input and thus the channels, and provides electrical signals at the input of each driver. One or more light-emitting devices are coupled between the output of each driver and a corresponding optical channel to which the driver is coupled, where the optical channels coupled to the drivers of the host transmitter collectively form a first set of optical channels. The drivers and the light-emitting devices perform an EO conversion of the electrical signals received at the host transmitter input, and output or transmit the corresponding optical signals over the first set of optical channels. The host receiver comprises one or more photodetectors or photosensors, and an input of each photodector is coupled to an optical fiber or channel of the optical link over which optical signals are received. The optical fibers coupled to the photodetectors collectively form a second set of optical fibers or channels of the optical link. A TIA is coupled between the output of each photodetector and one or more data lines or cables that receive electrical signals output by the TIA. The photodetectors and the TIAs collectively perform an OE conversion of the optical signals received at the host receiver input, and output or transmit the corresponding electrical signals via the host receiver output. As a more specific example, which does not limit the embodiments described herein, an adapter card of the host transceiver couples to and communicates with components of the host motherboard, and an external data cable couples to the host transceiver. Electrical data signals are transported to/from the host transceiver via electrical signal input/output channels.

A host transceiver microcontroller of the host transceiver is coupled to and controls the operating states of the host transmitter and host receiver, and the host transceiver microcontroller enables the optical link to transport both the data and the auxiliary signals between the host transceiver and the target transceiver without the need for separate or dedicated channels for the auxiliary signals. In so doing the host transceiver microcontroller, acting as the auxiliary signal interface for the host transceiver, receives the auxiliary signals. The received auxiliary signals comprise a first set of auxiliary signals received from the host and a second set of auxiliary signals received from the target via the optical link. The host transceiver microcontroller determines the collective signal configuration of the received auxiliary signals and, based on the collective signal configuration, controls the operating states of the host transmitter and host receiver between a first state and a second state. The first state, which is a data state in which data are exchanged between the host transceiver and the target transceiver via the optical link, is commanded by the host transceiver microcontroller in response to detecting a first signal configuration encoded in the auxiliary signals. The second state, which is an auxiliary state in which auxiliary signals (e.g., status and control signals) are exchanged between the host transceiver and the target transceiver via the optical link, is commanded by the host transceiver microcontroller in response to detecting a second signal configuration encoded in the auxiliary signals. Additionally, the host transceiver microcontroller controls the host transmitter to encode the first set of auxiliary signals received from the host for transmission via the optical link to the target transceiver, and disables the output of the host receiver while in the auxiliary state.

The host transceiver includes host idle detection circuitry that includes a detector that is coupled between the input of a channel driver and the host transceiver microcontroller. The detector measures a parameter of the channel driver input signal, and outputs a detector signal representative of the parameter. The host transceiver microcontroller uses the detector signal to determine whether a data signal is present at the corresponding channel driver input. When the host transceiver microcontroller determines that no modulated data signal is present at the channel driver input it outputs a transmitter output disable control that disables the transmitter driver outputs. Thus, the host transceiver microcontroller controls the transmitter driver outputs so that when the driver input signal at a channel does not include data the transmitter driver outputs are turned off and no light is transmitted to the target receiver. When the TIAs of the target receiver fail to detect light on the first set of optical channels, they determine that data is not present on the optical link so that an electrical idle condition is present and, in response, disable their respective outputs to avoid a situation where noise signals are output by the target receiver in the absence of data. The target transceiver microcontroller also turns off the target transmitter output so that no light is transmitted on the second set of optical channels. The idle detection circuitry of an embodiment thus eliminates any chance that the target receiver detects a signal in the absence of a data input signal at the host transmitter and reduces or eliminates signal transmission errors resulting from noise.

Similarly, the target transceiver both transmits and receives information over the optical link and, as such, comprises a target transmitter and a target receiver. The target transmitter comprises one or more channels, and each channel includes a driver. One or more data lines or cables are coupled to the target transmitter input and thus the channels, and provides electrical signals at the input of each driver. One or more light-emitting devices are coupled between the output of each driver and a corresponding optical channel to which the driver is coupled, where the optical channels coupled to the drivers of the target transmitter collectively form the second set of optical channels. The drivers and the light-emitting devices perform an EO conversion of the electrical signals received at the target transmitter input, and output or transmit the corresponding optical signals over the second set of optical channels. The target receiver comprises one or more photodetectors or photosensors, and an input of each photodector is coupled to an optical fiber or channel of the optical link over which optical signals are received. The optical fibers coupled to the photodetectors collectively form the first set of optical fibers or channels of the optical link over which optical signals are received. A TIA is coupled between the output of each photodetector and one or more data lines or cables that receive electrical signals output by the TIA. The photodetectors and the TIAs collectively perform an OE conversion of the optical signals received at the target receiver input, and output or transmit the corresponding electrical signals via the target receiver output. As a more specific example, which does not limit the embodiments described herein, an adapter card of the target transceiver couples to and communicates with components of the target motherboard. Electrical data signals are transported to/from the target transceiver via electrical signal input/output channels.

A target transceiver microcontroller of the target transceiver is coupled to and controls the operating states of the target transmitter and target receiver, and the target transceiver microcontroller enables the optical link to transport both the data and the auxiliary signals between the target transceiver and the host transceiver without the need for separate or dedicated channels for the auxiliary signals. In so doing the target transceiver microcontroller, acting as the auxiliary signal interface for the target transceiver, receives the auxiliary signals. The received auxiliary signals comprise a first set of auxiliary signals received from the host transceiver via the optical link and a second set of auxiliary signals received from the target. The target transceiver microcontroller determines the collective signal configuration of the received auxiliary signals and, based on the collective signal configuration, controls the operating states of the target transmitter and target receiver between a first state and a second state. The first state, which is a data state in which data are exchanged between the host transceiver and the target transceiver via the optical link, is commanded by the target transceiver microcontroller in response to detecting a first signal configuration encoded in the auxiliary signals. The second state, which is an auxiliary state in which auxiliary signals (e.g., status and control signals) are exchanged between the host transceiver and the target transceiver via the optical link, is commanded by the target transceiver microcontroller in response to detecting a second signal configuration encoded in the auxiliary signals. Additionally, the target transceiver microcontroller controls the target transmitter to encode the first set of auxiliary signals received from the target for transmission via the optical link to the host transceiver, and disables the output of the target receiver while in the auxiliary state.

The target transceiver includes target idle detection circuitry that includes a detector that is coupled between the input of a channel driver and the target transceiver microcontroller. The detector measures a parameter of the channel driver input signal, and outputs a detector signal representative of the parameter. The target transceiver microcontroller uses the detector signal to determine whether a data signal is present at the corresponding channel driver input. When the target transceiver microcontroller determines that no modulated data signal is present at the channel driver input it outputs a transmitter output disable control that disables the transmitter driver outputs. Thus, the target transceiver microcontroller controls the transmitter driver outputs so that when the driver input signal at a channel does not include data the transmitter driver outputs are turned off and no light is transmitted to the host receiver. When the TIAs of the host receiver fail to detect light on the second set of optical channels, they determine that data is not present on the optical link so that an electrical idle condition is present and, in response, disable their respective outputs to avoid a situation where noise signals are generated by the host receiver in the absence of data. The host transceiver microcontroller also turns off the host transmitter output so that no light is transmitted on the first set of optical channels. Consequently, the target idle detection circuitry of an embodiment eliminates any chance that the host receiver detects a signal in the absence of a data input signal at the target transmitter and reduces or eliminates signal transmission errors resulting from noise.

The auxiliary signals of an embodiment include, but are not limited to, the auxiliary signals of the PCIe protocol, including a present signal (e.g., CPRSNT#), a wake signal (e.g., CWAKE#), a platform reset signal (e.g., CPERST#), and a power on signal (e.g., CPWRON). The present signal is transmitted by a device to indicate the device is present on the optical link. The wake signal is transmitted by a device to command a receiving device to awaken. The platform reset signal is transmitted by a device to indicate a power state and a reset state of the device. The power on signal is transmitted by a device to notify a receiving device that power is present at the transmitting device.

More specifically, considering the auxiliary signals in the data transport system described herein that includes a host transceiver and a target transceiver coupled with an optical link, the host transceiver microcontroller receives the platform reset signal and the power on signal from the host, and receives the present signal and the wake signal from the target via the optical link. The host transceiver microcontroller detects the state of each of these auxiliary signals, and when the detected states combine to form a code that matches a first code, the host transceiver microcontroller determines that the data transport system is properly configured to transport data. When the detected states of these auxiliary signals combine to form a code that matches a second code, the host transceiver microcontroller determines that the data transport system is improperly configured to transport data, and can then be configured to transport auxiliary signals. Generally, however, the system of an embodiment includes N links that correspond to a number of states $2^N$ that can be arbitrarily assigned to the auxiliary signals.

Additionally, the target transceiver microcontroller receives the platform reset signal and the power on signal from the host transceiver via the optical link, and receives the present signal and the wake signal from the target. The target transceiver microcontroller detects the state of each of these auxiliary signals, and when the detected states combine to form a code that matches a first code, the target transceiver microcontroller determines that the data transport system is properly configured to transport data. When the detected states of these auxiliary signals combine to form a code that matches a second code, the target transceiver microcontroller determines that the data transport system is improperly configured to transport data, and can then be configured to transport auxiliary signals.

In this example configuration, the host transceiver microcontroller receives electrical auxiliary signals from a host that include a platform reset signal and power on signal, and receives optical auxiliary signals from a target that include a present signal and wake signal, but the host transceiver microcontroller is not so limited. Similarly, the target transceiver microcontroller receives optical auxiliary signals from a host that include a platform reset signal and power on signal, and receives electrical auxiliary signals from a target that include a present signal and wake signal, but the target transceiver microcontroller is not so limited.

While these four auxiliary signals (two signals provided by the host, two signals provided by the target) collectively have multiple possible signal configurations, in an embodiment, at least one signal configuration exclusively supports the transmission of data over the optical channels of the optical link, and at least one other signal configuration exclusively supports the transmission of auxiliary signals over the same optical channels that transport the data. Therefore, the host transceiver and the target transceiver exclusively transmit data over the optical link when they sense an appropriate data transport configuration, referred to herein as the terminal state or data state, and exclusively transmit auxiliary signals over the optical link when they sense an appropriate auxiliary signal transport configuration, referred to herein as the auxiliary state. When either the host transceiver or the target transceiver fails to detect the proper signal configuration for data transmission (terminal state), that transceiver ceases data transmission and receiving operations and initiates auxiliary signal transmission and receiving operations (auxiliary state).

The data transport system of an embodiment includes a first set of codes in which each code represents a particular signal configuration of the terminal state. The data transport system further includes a second set of codes in which each code represents a particular signal configuration of the auxiliary state. The term "code" or "codes" as used herein therefore represents a configuration of the optical link driven by a transceiver microcontroller or data transport system. The codes are generated through controlled activation/deactivation of the optical channels of the optical link. The controlled activation/deactivation generates an optical pattern that represents each code, as appropriate to a desired state of the data transport system, so that the code corresponds to the collective states of the signals on the optical channels of the link.

Thus, a first set of codes corresponds to signal states indicative of the terminal state in which the data transport system is properly configured to transport data, and a second set of codes corresponds to signal states indicative of the auxiliary state in which the data transport system is properly configured to transport auxiliary signals, but is not properly configured to transport data.

Each code of an embodiment is a binary code but is not so limited. Considering the first set of codes that represent the terminal state, six different optical power patterns or states are transmitted to emulate the signals being transmitted across the channels from each of the host and target, but the embodiment is not limited to six patterns. The first set of codes of an embodiment that correspond to the terminal state include, for example, 0000 (represents data idle), 0001 (represents ×1 data), 0011 (represents ×2 data), 1000 (represents ×1 data), 1100 (represents ×2 data), and 1111 (represents ×4 data), but the embodiment is not limited to these values.

Regarding the second set of codes that represent the auxiliary state, four different optical power patterns or states are transmitted to emulate the two auxiliary signals being transmitted across the channels from each of the host and target. The auxiliary codes indicate the state of the two auxiliary signals being passed across the optical link from one system to another system. The system uses four codes because two auxiliary signals pass in each direction, and it takes four codes to encode the two auxiliary signals, but the system is not so limited.

The second set of codes of an embodiment that correspond to the auxiliary state includes codes transmitted by the host transceiver and codes transmitted by the target transceiver. The second set of codes transmitted by the host transceiver corresponding to the auxiliary state includes the following: 1001 corresponding to CPERST in a low logic state and CPWRON in a low logic state; 1011 corresponding to CPERST in a low logic state and CPWRON in a high logic state; 1101 corresponding to CPERST in a high logic state and CPWRON in a low logic state; and 1110 corresponding to CPERST in a high logic state and CPWRON in a high logic state. The second set of codes transmitted by the target transceiver corresponding to the auxiliary state includes the following: 1001 corresponding to CPRSNT in a low logic state and CWAKE in a low logic state; 1011 corresponding to CPRSNT in a low logic state and CWAKE in a high logic state; 1101 corresponding to CPRSNT in a high logic state and CWAKE in a low logic state; and 1110 corresponding to CPRSNT in a high logic state and CWAKE in a high logic state. The second set of codes of an embodiment that correspond to the auxiliary state further comprises at least one of 0111, 0110, 0010, 0100, 0101, and 1010, but is not so limited.

When considering a hexadecimal representation, the second set of codes of an embodiment that correspond to the auxiliary state include the hexadecimal values 0x09, 0x0b, 0x0d, and 0x0e, but the embodiment is not limited to these values. An alternative embodiment can use the hexadecimal values 0x04, 0x05, 0x06, and 0x07 to signal the auxiliary state, but the alternative embodiment is not limited to these values.

Figure 3:
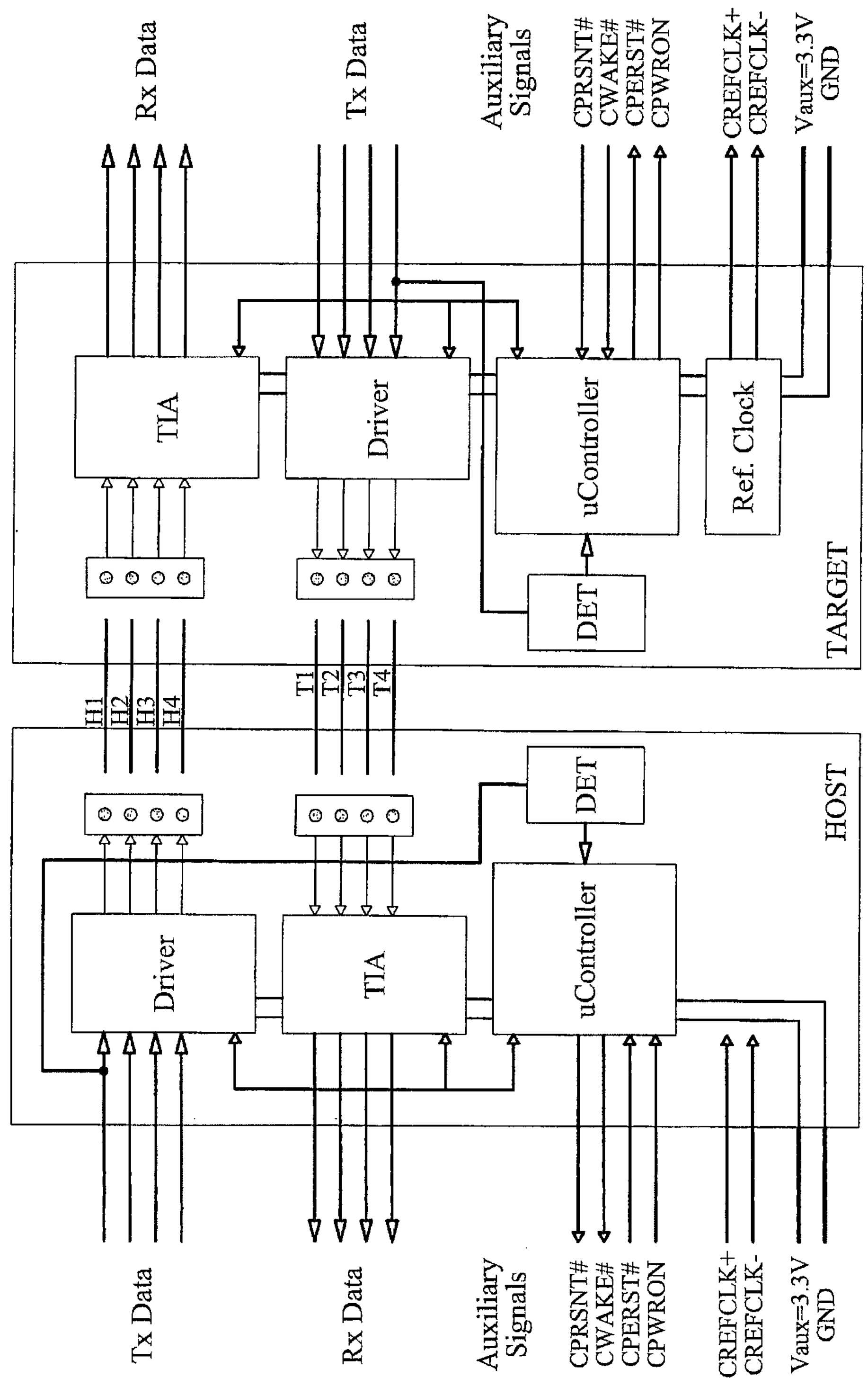
FIG. 3 is a block diagram of an optical interface system that includes first and second optical transceiver modules generating optical patterns that represent codes of the auxiliary state, under an embodiment.

An example of code generation by the data transport system, FIG. 3 is a block diagram of an optical interface system that includes a first optical transceiver module and a second optical transceiver module generating optical patterns that represent codes of the second code set (auxiliary state), under an embodiment. As described above, the codes are generated through controlled activation and deactivation of the optical channels of the optical link, where the controlled activation and deactivation generates an optical pattern that represents each code, as appropriate to a desired state of the data transport system, so that the code corresponds to the collective states of the signals on the optical channels of the link. Therefore, using an example in which the host transceiver generates and transmits the code "1101" corresponding to CPERST in a high logic state and CPWRON in a low logic state, the host transceiver microcontroller receives that CPERST# and CPWRON signals and in response controls the host transmitter to transmit light ("1") on optical channels H1 (LSB), H3, and H4 (MSB), and to disable the output of the driver ("0") corresponding to optical channel H2. Similarly, using an example in which the target transceiver generates and transmits the code "1001" corresponding to CPRSNT in a low logic state and CWAKE in a low logic state, the target transceiver microcontroller receives that CPRSNT# and CWAKE# signals and in response controls the target transmitter to transmit light ("1") on optical channels T1 (LSB) and T4 (MSB), and to disable the output of the drivers ("0") corresponding to optical channels T2 and T3.

An example is described below involving operation of the data transport system of an embodiment. With reference to the system of FIG. 2B, when the data transport system is initially powered on, operations are initiated in the auxiliary state. When operating in the auxiliary state, each of the host transceiver and the target transceiver are monitoring the auxiliary signals received from their respective data processing units as well as the auxiliary signals received via the optical link from the device at the other end of the optical link. So, for example, the host transceiver is monitoring auxiliary signals in the form of electrical signals received from the host and auxiliary signals received via the optical link from the target, while the target transceiver is monitoring auxiliary signals received from the target and auxiliary signals received via the optical link from the host. Using the auxiliary signals, a transceiver (e.g., host, target) transitions from the auxiliary state into the data state in response to detecting the terminal state, where the terminal state is the state in which the signal states detected among the auxiliary signals are states indicating the data transport system is appropriately configured for data transport operations. As one example, the terminal state is the state in which the CPRSNT# auxiliary signal is in a low logic state (active-low signal), the CPERST# auxiliary signal is in a high logic state (active-low signal), the CPWRON auxiliary signal is in a high logic state (active-high signal), and the CWAKE# auxiliary signal is in a high logic state (active-low signal), but the embodiment is not limited to this signal configuration.

The data transport system transports data across the optical link when operating in the terminal state, as described above. The data transport system operates in the terminal state until a state change is detected in any auxiliary signal, because the state change in any auxiliary signal causes the collective auxiliary signal configuration to deviate from that required for the terminal state (e.g., CPRSNT# auxiliary signal is in a low logic state, CPERST# auxiliary signal is in a high logic state, CPWRON auxiliary signal is in a high logic state, and CWAKE# auxiliary signal is in a high logic state). The state change in any auxiliary signal can be detected using the auxiliary signals received from the processing unit of the local device and from the auxiliary signals received from the remote device at the other end of the optical link. The host transceiver microcontroller and target transceiver microcontroller of an embodiment continuously monitor auxiliary signals and, upon detecting any change in auxiliary signal states, switch operation to the auxiliary state, and remains in the auxiliary state until such time as the terminal state is again detected.

Therefore, in an embodiment, the data transport system includes a limited number of auxiliary signal states in which the data channels can pass data, and any other set of signal states causes the system to change operation to the auxiliary state. As an example, when a host transceiver detects that any signal from a target transceiver at the other end of the optical link is in any state other than a state allowed for passing data, the host transceiver microcontroller determines that the target transceiver wants to transmit auxiliary signals and, in response, takes control of the optical link by transmitting an appropriate auxiliary pattern (code) to the target transceiver using selective activation and deactivation of host transmitter channels as appropriate to generate the optical pattern or code representing the auxiliary signal states (e.g., reset (active-low signal) goes to a high logic state; power on (active-high signal) goes to a low logic state). In an embodiment, the host transceiver transmits the auxiliary pattern continuously while the data transport system is in the auxiliary state, but the embodiment is not so limited. The target transceiver recognizes the auxiliary pattern and transmits auxiliary signals in response using selective activation and deactivation of target transmitter channels to generate the appropriate auxiliary pattern.

As described above, while the host transceiver and target transceiver are in the terminal state, only data can be transmitted over the optical link, meaning auxiliary signals are not transmitted during the terminal state. Once the data transport system is controlled into the terminal state, the transmitter outputs of the host transceiver and target transceiver are disabled so no light is transmitted via the optical link, and the data transport system waits for data to appear at the input. When data is received at an input of a transmitter of either the host transceiver or the target transceiver, the data transport system enables the transmitter outputs on the side of the optical link where the data appears at the input and initiates the transmission of data over the optical link. When the data transport system subsequently detects an absence of data at the input of either transmitter, the system again disables the corresponding transmitter output so no light is transmitted via the optical link.

Because the data transport system of an embodiment has two conditions to be met in order to transport data over the optical link, the data state described herein can be thought of as comprising two data sub-states. The two data sub-states correspond to the two conditions necessary for data transmission, which include a first condition that the auxiliary signals indicate the data transport system is in the appropriate state for data transmission, the terminal state, and a second condition that data be present for transmission at the input of at least one transmitter. As such, the data transport system of an embodiment includes a first data sub-state that is a data-idle state in which the auxiliary signals are in the terminal state and the data transport system is waiting for data to be present at the input of the transmitter. A second data sub-state of the data transport system is a data-active state in which the auxiliary signals are in the terminal state and data is present at the input of the transmitter.

Figure 4A:
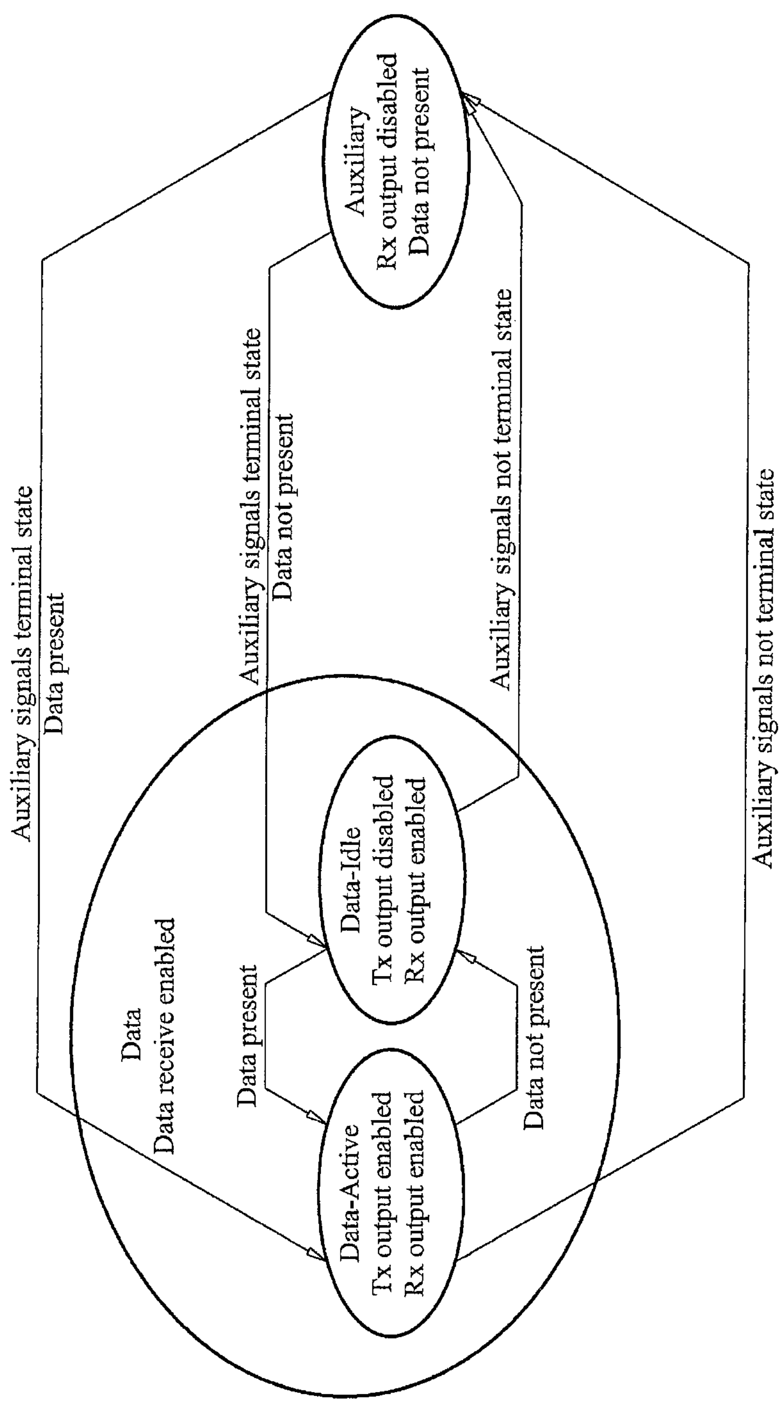
FIG. 4A is a state diagram of data transport system operations involving the multiplexing of auxiliary signals and data for transmission over an optical link, under an embodiment.

FIG. 4A is a state diagram of data transport system operations involving the multiplexing of auxiliary signals and data for transmission over an optical link, under an embodiment. Operations commence in the auxiliary state in which data transport capabilities are disabled. In the auxiliary state, the transceiver receiver outputs are disabled (no data output), the transceiver transmitter outputs are selectively enabled/disabled as appropriate to generate the optical pattern or code representing the auxiliary signal states, the TIA squelches of each receiver channel are selectively enabled/disabled according to signals transmitted on that channel by the corresponding transmitter, and the transceiver transmitter inputs are not monitored for the presence of data.

Operations transition from the auxiliary state directly to the data-active state when the signal states detected among the auxiliary signals indicate the data transport system is appropriately configured for data transport operations, and data is present at the input of any transmitter of the data transport system. In the data-active state, the transceiver receiver outputs are enabled (output data), the transceiver transmitter outputs are enabled, the TIA squelches of each receiver channel are disabled, and the transceiver transmitter inputs are monitored for the presence of data. While in the data-active state, if the detected states of the auxiliary signals indicate the data transport system is appropriately configured to transport data, but no data is detected at the input of any transmitter, operations transition to the data-idle state. Furthermore, while in the data-active state, if the detected states of the auxiliary signals indicate the data transport system transitions into a state in which it is improperly configured to transport data, operations transition to the auxiliary state.

Operations transition from the auxiliary state to the data-idle state when the signal states detected among the auxiliary signals indicate the data transport system is appropriately configured for data transport operations, but no data is detected at the input of the transmitter. In the data-idle state, the transceiver receiver outputs are enabled, as described in detail herein, the transceiver transmitter outputs are disabled, the TIA squelches of each receiver channel are enabled, and the transceiver transmitter inputs are monitored for the presence of data. While in the data-idle state, if the detected states of the auxiliary signals indicate the data transport system is appropriately configured to transport data, and data is subsequently detected at the input of any transmitter, operations transition to the data-active state in which the data is transported over the optical link. Additionally, while in the data-idle state, if the detected states of the auxiliary signals indicate the data transport system transitions into a state in which it is improperly configured to transport data, operations transition to the auxiliary state.

Figure 4B:
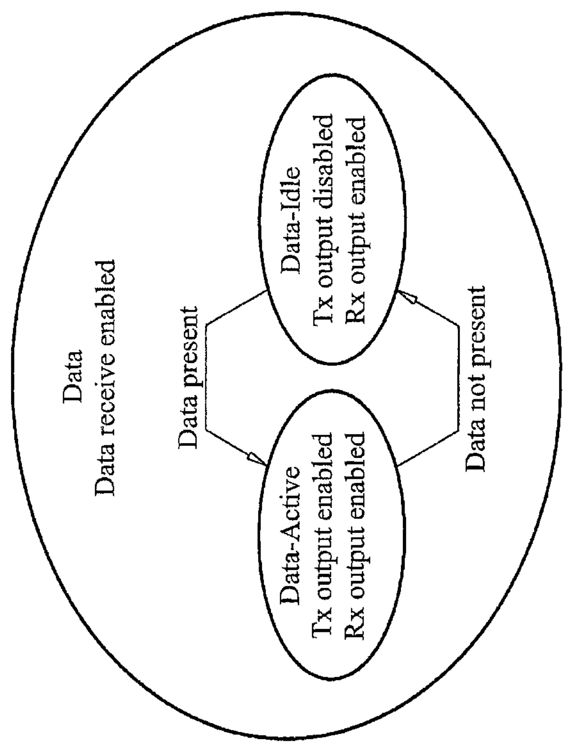
FIG. 4B is a state diagram of data transport system operations in which auxiliary signals are disregarded, under an alternative embodiment.

As described above, particular protocols (e.g., PCIe, Serial Attached Small Computer System Interface (SCSI) (SAS), etc.) may not use auxiliary signals but, instead, use the electrical idle state (absence of data on a channel) alternating with periods during which data is transmitted as a method for transporting information. Thus, the data transport system of an alternative embodiment does not use or at least disregards the auxiliary signals and, as such, does not transport auxiliary signals over the optical link. FIG. 4B is a state diagram of data transport system operations in which auxiliary signals are disregarded, under an alternative embodiment. Under this embodiment, during operations in the data-idle state, the transceiver receiver outputs are enabled, the TIA squelches of each receiver channel are enabled, the transceiver transmitter outputs are disabled, and the transceiver transmitter inputs are monitored for the presence of data, as described in detail herein. While in the data-idle state, when data is detected at the input of any transmitter, operations transition to the data-active state in which the transmitter outputs are enabled and data is transported over the optical link. If a system operating under this state diagram is used to transmit the auxiliary signals with binary codes as described herein, however, two or more channels would be used to transmit the binary codes.

During operations in the data-active state, the transceiver receiver outputs are enabled, the transceiver transmitter outputs are enabled, and the transceiver transmitter inputs are monitored for the presence of data. Data present at the input of any transmitter of the data transport system is transmitted during the data-active state. While in the data-active state, if no data is detected at the input of any transmitter, operations transition to the data-idle state.

Figure 5A:
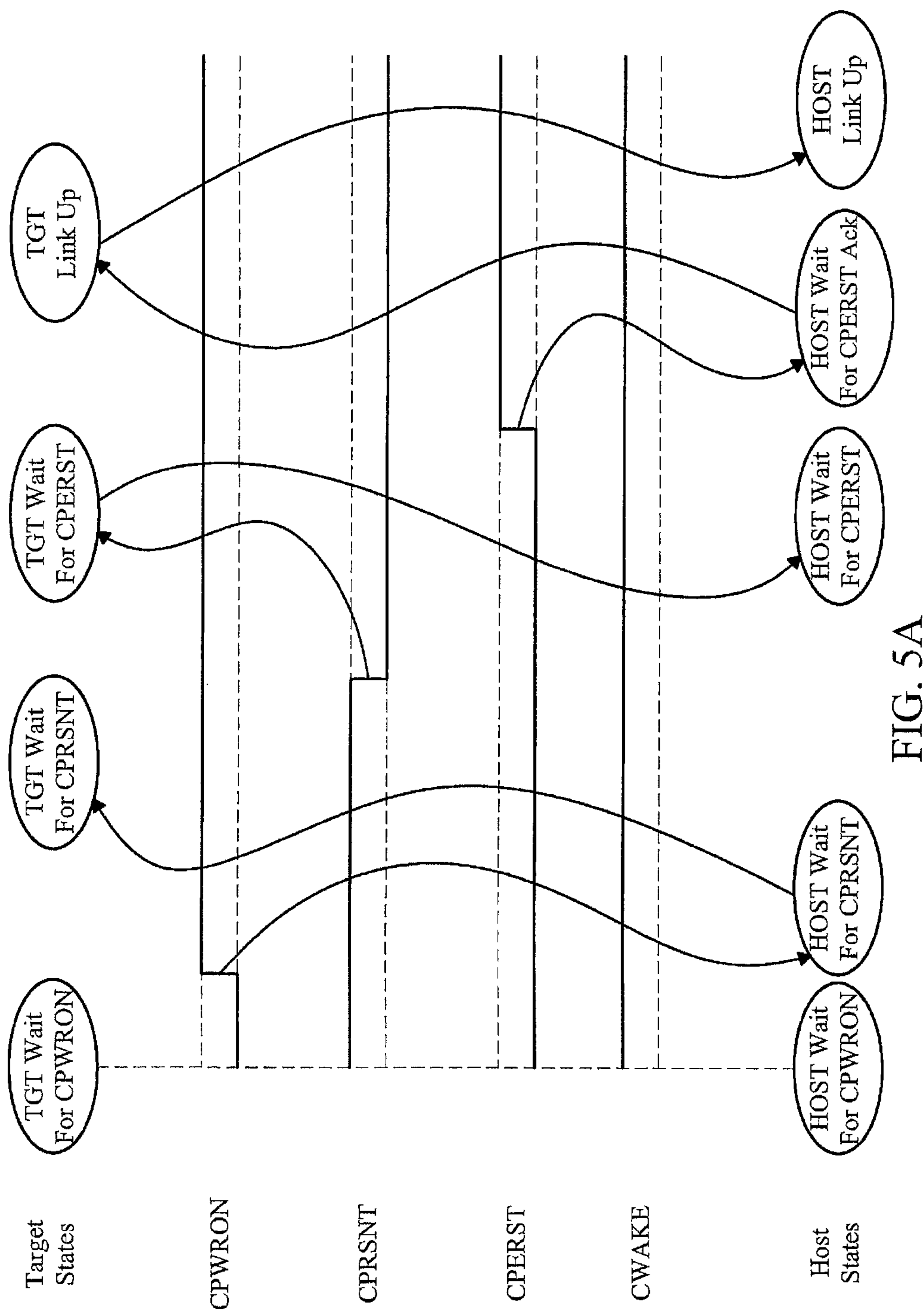
FIG. 5A is a signal diagram for power up to terminal state operation, under an alternative embodiment.
Figure 5B:
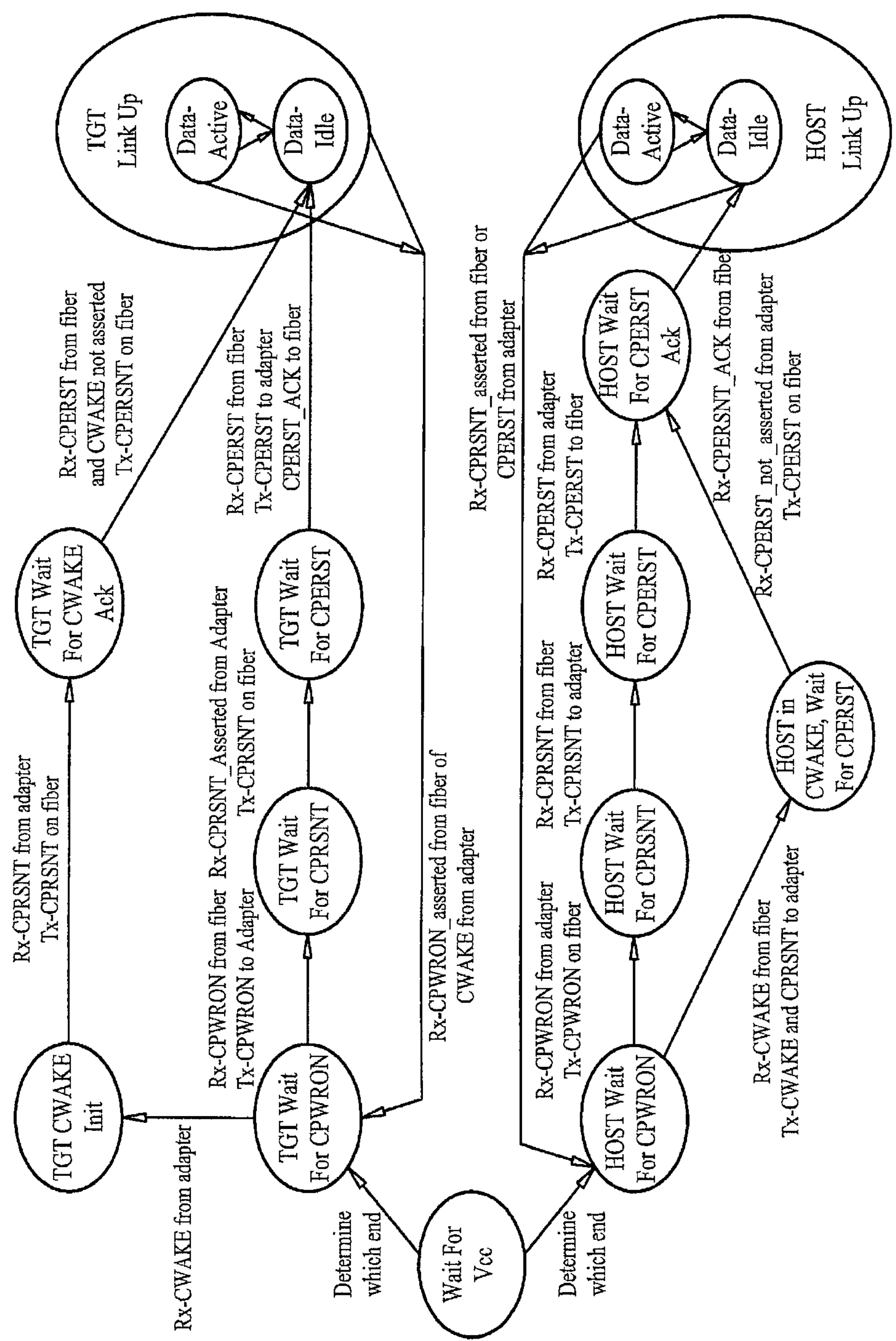
FIG. 5B is a flow diagram representing the state diagram for power up to terminal state transition, under the alternative embodiment.

As an example of an embodiment that uses the auxiliary signal states, FIG. 5A is a signal diagram for power up to terminal state operation, under an alternative embodiment. This signal diagram for power up to terminal state operation enforces the PCIe external cable specification power-up and power-down sequences, but the embodiments are not so limited. In this sequence, and with reference to the system of FIG. 2B, the system is powered on and the host and target wait for the CPWRON signal. The host receives the CPWRON signal, which is asserted by changing the signal state from a logic low to a logic high state (active-high signal), and transports the CPWRON signal to the target over the optical link. The host and target wait for the CPRSNT signal. The target receives the CPRSNT signal, which is asserted by changing the signal state from a logic high to a logic low state (active-low signal), and transports the CPRSNT signal to the host over the optical link. The host and target wait for the CPERST signal. The host receives the CPERST signal, which is asserted by changing the signal state from a logic low to a logic high state (active-low signal), and transports the CPERST signal to the target over the optical link. The host waits on an acknowledgement of the CPERST signal from the target and, in response to receiving the acknowledgement, links up with the target. The target also links up with the host so that at this point the target and the host recognize these signal states as representing the terminal state and, in response, enable the terminal state by linking up. FIG. 5B is a flow diagram representing the state diagram for power up to terminal state transition, under the alternative embodiment.

The system of an embodiment accurately detects and enables use of the electrical idle state through use of idle detection circuitry, as described above. The idle detection circuitry detects electrical idle states and uses a transmitter output disable control to disable signal transmission over the optical link when the idle state is detected. The transmitter output disable therefore, in response to the electrical idle state being detected, prevents the transmission of noise over the optical link by disabling the transmitter output while in the idle state so that no light is transmitted on the corresponding optical channels. Additionally, the internal squelch circuits of the receiver TIAs described above, in response to sensing the absence of light on the optical link as a result of application of the transmitter output disable, squelch the receiver channel outputs on channels on which no light is detected.

Figure 6:
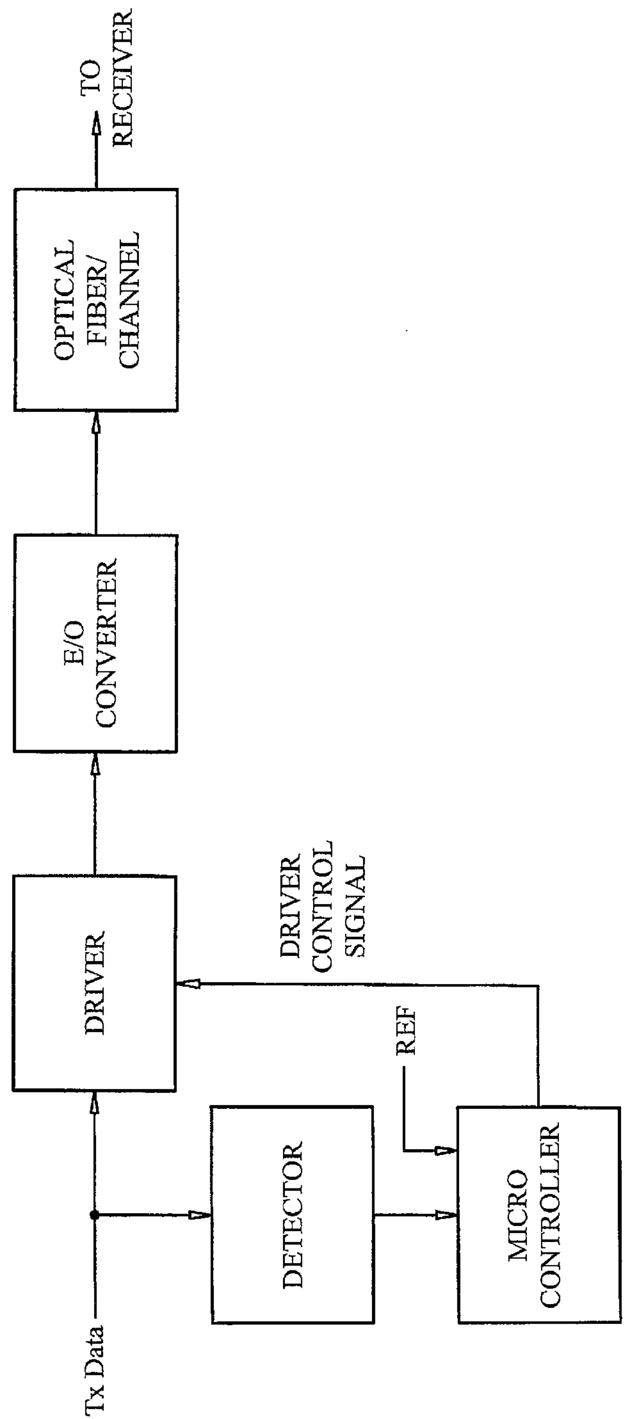
FIG. 6 is a block diagram of the detection circuitry and transmitter squelch circuitry used in support of the auxiliary signal multiplexing, under an embodiment.

FIG. 6 is a block diagram of the detection circuitry and transmitter squelch circuitry used in support of the auxiliary signal multiplexing, under an embodiment. The detection circuitry includes a detector that is coupled between the input of a channel driver and the transceiver microcontroller. Generally, the detector measures a parameter of the channel driver input signal, and outputs a detector signal representative of the parameter. The transceiver microcontroller may compare the parameter to a reference value and determine from the comparison whether a data signal is present at the channel driver input, but the embodiment is not so limited.

As an example, the detector can measure energy of the channel driver input signal at a pre-specified frequency (e.g., high frequency) or band of frequencies. In this example, the output of the detector is a voltage that is proportional to the RF energy detected in the channel driver input signal. The transceiver microcontroller compares the output voltage of the detector to a reference voltage and determines from the comparison whether a data signal is present at the transmitter driver input.

When the transceiver microcontroller determines that no modulated signal is present at a channel driver input it disables the driver output. While the driver output is disabled by the microcontroller, the corresponding driver remains active. Thus, the transceiver microcontroller controls the driver output so that when the driver input signal at the corresponding channel is below a specified threshold the driver output is disabled and no light is transmitted on that optical channel to the corresponding receiver.

When any TIA of the corresponding receiver fails to detect light on the corresponding optical channel of the optical link, the TIA determines that data is not present on the optical channel and, in response, squelches its output using the internal TIA squelch circuitry to avoid a situation where noise signals are generated by the receiver in the absence of data. Additionally, the receiver generates a flag indicating that the optical link is not transmitting a data signal, and the transceiver microcontroller can query this flag. The detection circuitry of an embodiment thus eliminates any chance that a receiver detects a signal in the absence of a data signal at the transmitter and reduces or eliminates signal transmission errors resulting from noise.

In an embodiment, the detector is coupled to one input channel of the transmitter, and when the input signal at this input channel is below a specified threshold the driver outputs of all transmitter drivers are disabled so that no data is transmitted on the optical link to the corresponding receiver. In an alternative embodiment, a detector is coupled to each input channel of the transmitter driver, and when the input signal at any input channel is below a specified threshold the driver output corresponding to that channel is turned off so that no light is transmitted on the corresponding optical channel to the corresponding receiver.

To complement the detection circuitry, the system of an embodiment includes write-ahead capability that counters the delay introduced through the operation of the detection circuitry as it toggles the driver between an active and an inactive state. In the situation where the system controls the driver from the inactive state to the active state, the system compensates for the delay by writing ahead to the driver an initial portion of the driver control signal. Then, in response to sensing data at the input to the driver, the transceiver microcontroller writes the final portion of the driver control signal which changes the system state from the inactive state to the active state.

For example, the delay introduced through control of the driver with the detection circuitry in an embodiment is approximately one (1) millisecond. The duration of this delay means the driver control signal that controls the driver from the inactive state to the active state has a length of approximately 162 bits. Using the write-ahead function, the system compensates for the delay by writing ahead 161 bits of the driver control signal to the driver and then, in response to sensing data at the input to the driver, writing the final bit of the driver control signal which changes the system state from the inactive state to the active state.

In the situation where the system controls the driver from the active state to the inactive state, the system compensates for the delay by toggling at least one bit of the driver control signal in violation of the driver control signal protocol. The driver responds to this toggling operation by ceasing data transmission activity and nearly simultaneously commanding all driver outputs to the inactive state.

The interface system described herein can be a component of a single system, multiple systems, and/or geographically separate systems. The interface system can also be a subcomponent or subsystem of a single system, multiple systems, and/or geographically separate systems. The interface system can be coupled to one or more other components (not shown) of a host system or a system coupled to the host system.

Embodiments described herein include a device comprising a transmitter coupled to a first end of an optical link. The optical link includes a plurality of optical channels. The device includes a receiver coupled to the first end of the optical link. A data transport system comprises the transmitter, the receiver and the optical link. The device includes a controller coupled to the transmitter and the receiver. The controller controls the transmitter and the receiver to operate in a first state when data are detected at an input of the transmitter. Data are transported via the data transport system in the first state. The controller controls the transmitter and the receiver to operate in a second state when the data are detected as absent at the input of the transmitter. Data are prevented from being transported via the data transport system in the second state.

Embodiments described herein include a device comprising: a transmitter coupled to a first end of an optical link, wherein the optical link includes a plurality of optical channels; a receiver coupled to the first end of the optical link, wherein a data transport system comprises the transmitter, the receiver and the optical link; and a controller coupled to the transmitter and the receiver, wherein the controller controls the transmitter and the receiver to operate in a first state when data are detected at an input of the transmitter, wherein data are transported via the data transport system in the first state, wherein the controller controls the transmitter and the receiver to operate in a second state when the data are detected as absent at the input of the transmitter, wherein data are prevented from being transported via the data transport system in the second state.

The device of an embodiment comprises a detector coupled between an input of the transmitter and the controller, wherein the detector measures a parameter of input signals present at the input and outputs a detector signal representative of the parameter.

The first state of an embodiment comprises a state in which an output of the transmitter is enabled and an output of the receiver is enabled.

The second state of an embodiment is an electrical idle state, wherein the controller detects the electrical idle state using the detector signal.

The electrical idle state of an embodiment comprises a state in which an output of the transmitter is disabled, an output of the receiver is enabled, and internal squelches coupled to each receiver output channel are enabled, and the controller is monitoring for the data at the input of the transmitter.

In response to detecting the electrical idle state the controller of an embodiment disables an output of the transmitter.

The controller of an embodiment disables the output of the transmitter by toggling at least one bit of a driver control signal in violation of a driver control signal protocol, wherein an output of at least one driver of the transmitter is disabled, wherein no light is transmitted over the optical channel when the driver is disabled.

In response to detecting the electrical idle state the controller of an embodiment enables at least one output of the receiver.

In response to detecting the electrical idle state the receiver of an embodiment enables at least one internal squelch of at least one receiver channel.

The controller of an embodiment disables an output of at least one driver of the transmitter when an absence of light is detected on at least one output channel of the optical link.

The controller of an embodiment uses a write-ahead protocol to reduce a delay resulting from control of the transmitter.

The second state of an embodiment is an auxiliary state in which a plurality of auxiliary signals comprising status and control signals is transported via the data transport system.

The auxiliary state of an embodiment comprises a state in which an output of the transmitter is selectively enabled and disabled as appropriate to generate at least one signal configuration of the auxiliary state, an output of the receiver is disabled, internal squelches coupled to each receiver output channel are selectively enabled and disabled as appropriate to the at least one signal configuration of the auxiliary state, monitoring for light at an input of the receiver is enabled, and monitoring for the data at the input of the transmitter by the controller is disabled.

The controller of an embodiment controls the transmitter and the receiver to operate in the first state when a first signal configuration is detected among the plurality of auxiliary signals.

The controller of an embodiment controls the transmitter and the receiver to operate in the second state when a second signal configuration is detected among the plurality of auxiliary signals.

The first signal configuration of an embodiment comprises a first code that indicates the transmitter and the receiver are properly configured to transport the data, wherein the first code is represented by combined states of the plurality of auxiliary signals.

The second signal configuration of an embodiment comprises a second code that indicates the transmitter and the receiver are improperly configured to transport the data, wherein the second code is represented by the combined states of the plurality of auxiliary signals and is different than the first code.

The transmitter of an embodiment comprises a plurality of channels and a plurality of drivers corresponding to the plurality of channels, wherein the controller selectively deactivates the plurality of drivers to generate the first code and the second code.

The transmitter of an embodiment comprises a plurality of channels, wherein each channel includes a driver.

The detector of an embodiment is coupled between an input of at least one channel and the controller, wherein the detector measures a parameter of input signals present at the input and outputs a detector signal representative of the parameter, wherein the controller compares the detector signal to a reference and uses the result of the comparison to determine when the data is present at the input of the transmitter.

The device of an embodiment comprises a driver control signal coupled between the controller and the driver, wherein the controller via the driver control signal enables a driver output of the driver when the data is detected at the input of the transmitter.

The controller of an embodiment, when the driver output is disabled, writes ahead an initial portion of the driver control signal, and writes a final portion of the driver control signal when the data is detected at the input of the transmitter.

The controller of an embodiment via the driver control signal disables the driver output when the data is detected as absent at the input of the transmitter.

The controller of an embodiment disables the driver outputs of the transmitter when the controller detects at the receiver an absence of light received over the optical link.

The controller of an embodiment disables the driver output by toggling at least one bit of the driver control signal in violation of a driver control signal protocol, wherein no light is transmitted over the optical channel when the driver output is disabled.

The second state of an embodiment is an auxiliary state in which a plurality of auxiliary signals comprising status and control signals are transported over the optical link, wherein the transmitter comprises at least one light-emitting device for transmitting the data over the optical link, wherein the receiver comprises at least one light-detecting device for receiving optical signals over the optical link.

The transmitter of an embodiment operating in the first state converts first data signals to first optical signals and outputs the first optical signals to the optical link.

The receiver of an embodiment operating in the first state converts second optical signals received over the optical link to second data signals.

The transmitter of an embodiment operating in the second state converts first auxiliary electrical signals to first auxiliary optical signals and outputs the first auxiliary optical signals to the optical link.

The receiver of an embodiment operating in the second state converts second auxiliary optical signals received over the optical link to second auxiliary electrical signals.

The data of an embodiment comprises first data signals and second data signals, and wherein the plurality of auxiliary signals comprises first auxiliary signals and second auxiliary signals.

The data and the auxiliary signals of an embodiment are compatible with a Peripheral Component Interconnect (PCI) Express (PCIe) protocol.

The transmitter of an embodiment operates in the first state to transport the first data signals over the optical link and operates in the second state to transport the first auxiliary signals over the optical link.

The receiver of an embodiment operates in the first state to receive the second data signals over the optical link and operates in the second state to receive the second auxiliary signals over the optical link.

The controller of an embodiment controls the transmitter and the receiver to operate in the first state when a first signal configuration is detected among the plurality of auxiliary signals, and controls the transmitter and the receiver to operate in the second state when a second signal configuration is detected among the plurality of auxiliary signals.

The first signal configuration of an embodiment comprises at least one first code that indicates the transmitter and the receiver are properly configured to transport the data, wherein the at least one first code is represented by combined states of the plurality of auxiliary signals.

The second signal configuration of an embodiment comprises at least one second code that indicates the transmitter and the receiver are improperly configured to transport the data, wherein the at least one second code is represented by the combined states of the plurality of auxiliary signals and is different than the first code.

The transmitter of an embodiment comprises a plurality of channels and a plurality of drivers corresponding to the plurality of channels, wherein the controller selectively deactivates driver outputs of the plurality of drivers to generate the at least one first code and the at least one second code.

The at least one first code of an embodiment is a member of a first code set, wherein the first code set includes a first plurality of binary codes.

The first plurality of binary codes of an embodiment comprises at least one of 0000, 0001, 0011, 1000, 1100, and 1111.

The at least one second code of an embodiment is a member of a second code set, wherein the second code set includes a second plurality of binary codes.

The second plurality of binary codes of an embodiment comprises at least one of 1001, 1011, 1101, and 1110.

The second plurality of binary codes of an embodiment comprises at least one of 0111, 0110, 0010, 0100, 0101, and 1010.

The plurality of auxiliary signals of an embodiment is auxiliary signals of a PCIe protocol, and the second plurality of binary codes corresponds to at least one auxiliary signal of the plurality of auxiliary signals.

The binary code 1001 of an embodiment corresponds to a platform reset signal in a low logic state and a power on signal in a low logic state.

The binary code 1011 of an embodiment corresponds to a platform reset signal in a low logic state and a power on signal in a high logic state.

The binary code 1101 of an embodiment corresponds to a platform reset signal in a high logic state and a power on signal in a low logic state.

The binary code 1110 of an embodiment corresponds to a platform reset signal in a high logic state and a power on signal in a high logic state.

The binary code 1001 of an embodiment corresponds to a present signal in a low logic state and a wake signal in a low logic state.

The binary code 1011 of an embodiment corresponds to a present signal in a low logic state and a wake signal in a high logic state.

The binary code 1101 of an embodiment corresponds to a present signal in a high logic state and a wake signal in a low logic state.

The binary code 1110 of an embodiment corresponds to a present signal in a high logic state and a wake signal in a high logic state.

The plurality of auxiliary signals of an embodiment is auxiliary signals of a PCIe protocol.

The plurality of auxiliary signals of an embodiment include at least one of a present signal, a wake signal, a platform reset signal, and a power on signal.

The present signal of an embodiment is transmitted by a device to indicate the device is present on the optical link, wherein the wake signal is transmitted by a device to command a receiving device to awaken, wherein the platform reset signal is transmitted by a device to indicate a power state and a reset state of the device, wherein the power on signal is transmitted by a host to notify a target that host power is present.

The first auxiliary electrical signals of an embodiment comprise the present signal and the wake signal, and the second auxiliary electrical signals comprise the platform reset signal and the power on signal.

The first auxiliary electrical signals of an embodiment comprise the platform reset signal and the power on signal, and the second auxiliary electrical signals comprise the present signal and the wake signal.

The transmitter of an embodiment comprises a plurality of channels and a plurality of drivers, wherein each channel includes a driver, and comprising a detector coupled between an input of at least one driver and the controller, wherein the detector measures a parameter of input signals present at the input and outputs a detector signal representative of the parameter.

The controller of an embodiment compares the detector signal to a reference and uses the result of the comparison to determine when data is present at the input of the at least one driver.

The device of an embodiment comprises a driver control signal coupled between the controller and the at least one driver, wherein the controller via the driver control signal enables at least one driver output of the at least one driver when the data is detected at the input of the at least one driver.

The driver control signal of an embodiment is coupled between the controller and a plurality of drivers of the transmitter, wherein the controller via the driver control signal enables a plurality of driver outputs of the plurality of drivers when the data is detected at the input of the at least one driver.

The controller of an embodiment, when the at least one driver output is disabled, writes ahead an initial portion of the driver control signal, and writes a final portion of the driver control signal when the data signal is detected at the input of the transmitter.

The controller of an embodiment via the driver control signal disables the at least one driver output when the data is detected as absent at the input of the at least one driver.

The controller of an embodiment disables the at least one driver output when the controller detects at the receiver an absence of light received over the optical link.

The controller of an embodiment disables the at least one driver output by toggling at least one bit of the driver control signal in violation of a driver control signal protocol, wherein no light is transmitted over the optical channel when the at least one driver output is disabled.

The controller of an embodiment via the driver control signal disables a plurality of driver outputs of the transmitter when the data is detected as absent at the input of the at least one driver.

The auxiliary state of an embodiment comprises a state in which an output of the transmitter is selectively enabled and disabled as appropriate to generate at least one signal configuration of the auxiliary state, an output of the receiver is disabled, internal squelches coupled to each receiver output channel are selectively enabled and disabled as appropriate to the at least one signal configuration of the auxiliary state, monitoring for light at an input of the receiver is enabled, and monitoring for the data at the input of the transmitter by the controller is disabled.

The first state of an embodiment comprises a plurality of sub-states.

A first sub-state of an embodiment is a data-idle state in which the first signal configuration is detected among the plurality of auxiliary signals, and the first data signals are absent at an input of the transmitter, wherein no data is transmitted over the optical link during the data-idle state.

The data-idle state of an embodiment comprises a state in which an output of the transmitter is disabled, an output of the receiver is enabled, internal squelches coupled to each receiver output channel are enabled, and the controller is monitoring for the data at the input of the transmitter.

A second sub-state of an embodiment is a data-active state in which the first signal configuration is detected among the plurality of auxiliary signals, and the first data signals are detected at an input of the transmitter, wherein data is transmitted optically over the optical link during the data-active state.

The data-active state of an embodiment comprises a state in which an output of the transmitter is enabled and an output of the receiver is enabled.

Embodiments described herein include a device comprising a transmitter coupled to a first end of an optical link that includes a plurality of optical channels. The device includes a receiver coupled to the first end of the optical link. A data transport system comprises the transmitter, the receiver and the optical link. The device includes controller coupled to the transmitter and the receiver. The device includes a detector coupled between an input of the transmitter and the controller. The detector outputs a detector signal representative of a parameter of a signal at the input. The controller detects an idle state using the detector signal and in response disables data transmission over the data transport system.

Embodiments described herein include a device comprising: a transmitter coupled to a first end of an optical link that includes a plurality of optical channels; a receiver coupled to the first end of the optical link, wherein a data transport system comprises the transmitter, the receiver and the optical link; a controller coupled to the transmitter and the receiver; and a detector coupled between an input of the transmitter and the controller, wherein the detector outputs a detector signal representative of a parameter of a signal at the input, wherein the controller detects an idle state using the detector signal and in response disables data transmission over the data transport system.

The idle state of an embodiment comprises a state during which data are detected as absent at the input of the transmitter.

The disabling of the data transmission of an embodiment comprises disabling an output of the transmitter.

The controller of an embodiment controls disabling of the output of the transmitter using a control signal coupled to the transmitter, wherein the control signal is configured to reduce delay resulting from control of the output.

The controller of an embodiment disables the output by toggling at least one bit of the control signal in violation of a control signal protocol, wherein light transmission over the optical link is prevented when the output is disabled.

The controller of an embodiment enables the output using a write-ahead technique applied to the control signal.

The transmitter of an embodiment comprises a plurality of channels and a plurality of drivers, wherein each channel includes a driver.

The detector of an embodiment is coupled between the controller and at least one channel of the plurality of channels, wherein the detector measures the parameter of the signal present on the at least one channel, wherein the controller compares the detector signal to a reference and uses the result of the comparison to determine when the data is absent at the input of the transmitter.

The device of an embodiment comprises a driver control signal coupled between the controller and the driver, wherein the controller via the driver control signal disables an output of the driver when the data is detected as absent at the input of the transmitter.

The controller of an embodiment disables an output of the driver by toggling at least one bit of the driver control signal in violation of a driver control signal protocol, wherein no light is transmitted over the optical channel when the driver output is disabled.

The disabling of the data transmission of an embodiment comprises squelching an output of the receiver using an internal squelch of the receiver.

The idle state of an embodiment comprises a state in which an output of the transmitter is disabled, an output of the receiver is enabled, and internal squelches coupled to each receiver output channel are enabled, and the controller is monitoring for the data at the input of the transmitter.

The controller of an embodiment disables an output of the transmitter when the controller detects at the receiver an absence of light received over the optical link.

The controller of an embodiment controls the transmitter to operate in a data state when data are detected at the input of the transmitter, wherein data are transported via the data transport system in the data state.

The controller of an embodiment controls the receiver to operate in a data state when data are detected at the input of the transmitter.

The data state of an embodiment comprises a state in which an output of the transmitter is enabled and an output of the receiver is enabled.

The transmitter of an embodiment comprises a plurality of channels, wherein each channel includes a driver, wherein the detector is coupled between the controller and at least one channel of the plurality of channels, wherein the detector measures the parameter of the signal present on the at least one channel and the controller compares the detector signal to a reference and uses the result of the comparison to determine when data is present at the input of the transmitter.

The device of an embodiment comprises a driver control signal coupled between the controller and the driver, wherein the controller via the driver control signal enables an output of the driver when the data is detected at the input of the transmitter.

The controller of an embodiment, when the output of the driver is disabled, writes ahead an initial portion of the driver control signal, and writes a final portion of the driver control signal when the data signal is detected at the input of the transmitter.

The controller of an embodiment controls the transmitter and receiver to operate in the data state when a first signal configuration is detected among a plurality of auxiliary signals.

The controller of an embodiment controls the transmitter and the receiver to operate in an auxiliary state when a second signal configuration is detected among the plurality of auxiliary signals The auxiliary state of an embodiment comprises a state in which a plurality of auxiliary signals comprising status and control signals are transported via the data transport system, wherein the transport of the auxiliary signals is performed using a same set of channels as the channels used for transport of the data.

The first signal configuration of an embodiment comprises at least one first code that indicates the transmitter and the receiver are properly configured to transport the data, wherein the at least one first code is represented by combined states of the plurality of auxiliary signals.

The second signal configuration of an embodiment comprises at least one second code that indicates the transmitter and the receiver are improperly configured to transport the data, wherein the at least one second code is represented by the combined states of the plurality of auxiliary signals and is different than the first code.

The transmitter of an embodiment comprises a plurality of channels and a plurality of drivers corresponding to the plurality of channels, wherein the controller selectively enables and disables the plurality of drivers to generate the at least one first code and the at least one second code.

The transmitter of an embodiment operating in the data state converts first data signals to first optical signals and outputs the first optical signals to the optical link.

The transmitter of an embodiment comprises at least one light-emitting device for transmitting the data over the optical link, wherein the receiver comprises at least one light-detecting device for receiving optical signals over the optical link.

The receiver of an embodiment operating in the data state converts second optical signals received over the optical link to second data signals.

The transmitter of an embodiment operating in the auxiliary state converts first auxiliary electrical signals to first auxiliary optical signals and outputs the first auxiliary optical signals to the optical link.

The receiver of an embodiment operating in the auxiliary state converts second auxiliary optical signals received over the optical link to second auxiliary electrical signals.

The data of an embodiment comprises first data signals and second data signals, and wherein the plurality of auxiliary signals comprises first auxiliary signals and second auxiliary signals.

The data and the auxiliary signals of an embodiment are compatible with a Peripheral Component Interconnect (PCI) Express (PCIe) protocol.

The transmitter of an embodiment operates in the data state to transport the first data signals over the optical link and operates in the auxiliary state to transport the first auxiliary signals over the optical link.

The receiver of an embodiment operates in the data state to receive the second data signals over the optical link and operates in the auxiliary state to receive the second auxiliary signals over the optical link.

The at least one first code of an embodiment is a member of a first code set, wherein the first code set includes a first plurality of binary codes.

The first plurality of binary codes of an embodiment comprises at least one of 0000, 0001, 0011, 1000, 1100, and 1111.

The at least one second code of an embodiment is a member of a second code set, wherein the second code set includes a second plurality of binary codes.

The second plurality of binary codes of an embodiment comprises at least one of 1001, 1011, 1101, and 1110.

The second plurality of binary codes of an embodiment comprises at least one of 0111, 0110, 0010, 0100, 0101, and 1010.

The plurality of auxiliary signals of an embodiment is auxiliary signals of a PCIe protocol, and the second plurality of binary codes corresponds to at least one auxiliary signal of the plurality of auxiliary signals.

The binary code 1001 of an embodiment corresponds to a platform reset signal in a low logic state and a power on signal in a low logic state.

The binary code 1011 of an embodiment corresponds to a platform reset signal in a low logic state and a power on signal in a high logic state.

The binary code 1101 of an embodiment corresponds to a platform reset signal in a high logic state and a power on signal in a low logic state.

The binary code 1110 of an embodiment corresponds to a platform reset signal in a high logic state and a power on signal in a high logic state.

The binary code 1001 of an embodiment corresponds to a present signal in a low logic state and a wake signal in a low logic state.

The binary code 1011 of an embodiment corresponds to a present signal in a low logic state and a wake signal in a high logic state.

The binary code 1101 of an embodiment corresponds to a present signal in a high logic state and a wake signal in a low logic state.

The binary code 1110 of an embodiment corresponds to a present signal in a high logic state and a wake signal in a high logic state.

The plurality of auxiliary signals of an embodiment is auxiliary signals of a PCIe protocol.

The plurality of auxiliary signals of an embodiment include at least one of a present signal, a wake signal, a platform reset signal, and a power on signal.

The present signal of an embodiment is transmitted by a device to indicate the device is present on the optical link, wherein the wake signal is transmitted by a device to command a receiving device to awaken, wherein the platform reset signal is transmitted by a device to indicate a power state and a reset state of the device, wherein the power on signal is transmitted by a host to notify a target that host power is present.

The first auxiliary electrical signals of an embodiment comprise the present signal and the wake signal, and the second auxiliary electrical signals comprise the platform reset signal and the power on signal.

The first auxiliary electrical signals of an embodiment comprise the platform reset signal and the power on signal, and the second auxiliary electrical signals comprise the present signal and the wake signal.

Embodiments described herein include a device comprising a transmitter coupled to an optical link comprising a plurality of optical channels. The transmitter operates in a first state to transport first data signals over the optical link and operates in a second state to transport first auxiliary signals over the optical link. The device includes a receiver coupled to the optical link. The receiver operates in the first state to receive second data signals over the optical link and operates in the second state to receive second auxiliary signals over the optical link. A plurality of auxiliary signals comprises the first auxiliary signals and the second auxiliary signals. The device includes a controller coupled to the transmitter and the receiver. The controller controls the transmitter and the receiver to operate in the first state when a first signal configuration is detected among the plurality of auxiliary signals, and controls the transmitter and the receiver to operate in the second state when a second signal configuration is detected among the plurality of auxiliary signals.

Embodiments described herein include a device comprising: a transmitter coupled to an optical link comprising a plurality of optical channels, wherein the transmitter operates in a first state to transport first data signals over the optical link and operates in a second state to transport first auxiliary signals over the optical link; a receiver coupled to the optical link, wherein the receiver operates in the first state to receive second data signals over the optical link and operates in the second state to receive second auxiliary signals over the optical link, wherein a plurality of auxiliary signals comprises the first auxiliary signals and the second auxiliary signals; and a controller coupled to the transmitter and the receiver, wherein the controller controls the transmitter and the receiver to operate in the first state when a first signal configuration is detected among the plurality of auxiliary signals, and controls the transmitter and the receiver to operate in the second state when a second signal configuration is detected among the plurality of auxiliary signals.

The first state of an embodiment is a data state in which data are transported over the optical link, and the second state is an auxiliary state in which status and control signals are transported over the optical link.

The transmitter of an embodiment operating in the first state converts first data signals to first optical signals and outputs the first optical signals to the optical link.

The transmitter of an embodiment comprises at least one light-emitting device for transmitting the data over the optical link, wherein the receiver comprises at least one light-detecting device for receiving optical signals over the optical link.

The receiver of an embodiment operating in the first state converts second optical signals received over the optical link to second data signals.

The transmitter of an embodiment operating in the second state converts first auxiliary electrical signals to first auxiliary optical signals and outputs the first auxiliary optical signals to the optical link.

The receiver of an embodiment operating in the second state converts second auxiliary optical signals received over the optical link to second auxiliary electrical signals.

The data and the auxiliary signals of an embodiment are compatible with a Peripheral Component Interconnect (PCI) Express (PCIe) protocol.

The first signal configuration of an embodiment comprises at least one first code that indicates the transmitter and the receiver are properly configured to transport the data, wherein the at least one first code is represented by combined states of the plurality of auxiliary signals.

The second signal configuration of an embodiment comprises at least one second code that indicates the transmitter and the receiver are improperly configured to transport the data, wherein the at least one second code is represented by the combined states of the plurality of auxiliary signals and is different than the first code.

The transmitter of an embodiment comprises a plurality of channels and a plurality of drivers corresponding to the plurality of channels, wherein the controller selectively enables and disables at least one driver output of the plurality of drivers to generate the at least one first code and the at least one second code.

The at least one first code of an embodiment is a member of a first code set, wherein the first code set includes a first plurality of binary codes.

The first plurality of binary codes of an embodiment comprises at least one of 0000, 0001, 0011, 1000, 1100, and 1111.

The at least one second code of an embodiment is a member of a second code set, wherein the second code set includes a second plurality of binary codes.

The second plurality of binary codes of an embodiment comprises at least one of 1001, 1011, 1101, and 1110.

The second plurality of binary codes of an embodiment comprises at least one of 0111, 0110, 0010, 0100, 0101, and 1010.

The plurality of auxiliary signals of an embodiment is auxiliary signals of the PCIe protocol, and the second plurality of binary codes corresponds to at least one auxiliary signal of the plurality of auxiliary signals.

The binary code 1001 of an embodiment corresponds to a platform reset signal in a low logic state and a power on signal in a low logic state.

The binary code 1011 of an embodiment corresponds to a platform reset signal in a low logic state and a power on signal in a high logic state.

The binary code 1101 of an embodiment corresponds to a platform reset signal in a high logic state and a power on signal in a low logic state.

The binary code 1110 of an embodiment corresponds to a platform reset signal in a high logic state and a power on signal in a high logic state.

The binary code 1001 of an embodiment corresponds to a present signal in a low logic state and a wake signal in a low logic state.

The binary code 1011 of an embodiment corresponds to a present signal in a low logic state and a wake signal in a high logic state.

The binary code 1101 of an embodiment corresponds to a present signal in a high logic state and a wake signal in a low logic state.

The binary code 1110 of an embodiment corresponds to a present signal in a high logic state and a wake signal in a high logic state.

The plurality of auxiliary signals of an embodiment is auxiliary signals of the PCIe protocol.

The plurality of auxiliary signals of an embodiment include at least one of a present signal, a wake signal, a platform reset signal, and a power on signal.

The present signal of an embodiment is transmitted by a device to indicate the device is present on the optical link, wherein the wake signal is transmitted by a device to command a receiving device to awaken, wherein the platform reset signal is transmitted by a device to indicate a power state and a reset state of the device, wherein the power on signal is transmitted by a host to notify a target that host power is present.

The first auxiliary electrical signals of an embodiment comprise the present signal and the wake signal, and the second auxiliary electrical signals comprise the platform reset signal and the power on signal.

The first auxiliary electrical signals of an embodiment comprise the platform reset signal and the power on signal, and the second auxiliary electrical signals comprise the present signal and the wake signal.

The first state of an embodiment comprises a state in which an output of the transmitter is enabled and an output of the receiver is enabled.

The second state of an embodiment comprises a state in which an output of the transmitter is selectively enabled and disabled based on the first signal configuration and the second signal configuration, the output of the receiver is disabled, internal squelches coupled to each receiver output channel are selectively enabled and disabled as appropriate to the first signal configuration and the second signal configuration, monitoring for light at an input of the receiver is enabled, and monitoring for the data at the input of the transmitter by the controller is disabled.

The transmitter of an embodiment comprises a plurality of channels and a plurality of drivers, wherein each channel includes a driver.

The device of an embodiment comprises a detector coupled between an input of at least one driver and the controller, wherein the detector measures a parameter of the first data signals present at the input and outputs a detector signal representative of the parameter.

The controller of an embodiment compares the detector signal to a reference and uses the result of the comparison to determine when a data signal is present at the input of the at least one driver.

The device of an embodiment comprises a driver control signal coupled between the controller and the at least one driver, wherein the controller via the driver control signal enables at least one driver output of the at least one driver when the data signal is detected at the input of the transmitter.

The at least one driver output of an embodiment is disabled, enables the at least one driver output by writing ahead an initial portion of the driver control signal, and writing a final portion of the driver control signal when the data signal is detected at the input of the transmitter.

The controller of an embodiment via the driver control signal disables the at least one driver output when the data signal is detected as absent at the input of the at least one driver.

The controller of an embodiment disables the at least one driver output by toggling at least one bit of the driver control signal in violation of a driver control signal protocol, wherein no light is transmitted over the optical channel when the at least one driver output is disabled.

The controller of an embodiment disables the at least one driver output when the controller detects at the receiver an absence of light received over the optical link.

The receiver of an embodiment enables at least one internal squelch of at least one receiver output channel when an absence of light is detected on a corresponding channel of the optical link.

The first state of an embodiment comprises a plurality of sub-states.

A first sub-state of an embodiment is a data-idle state in which the first signal configuration is detected among the plurality of auxiliary signals, and the first data signals are absent at an input of the transmitter, wherein no data is transmitted over the optical link during the data-idle state.

The data-idle state of an embodiment comprises a state in which an output of the transmitter is disabled, an output of the receiver is enabled, internal squelches coupled to each receiver output channel are enabled, and the controller is monitoring for the data at the input of the transmitter.

A second sub-state of an embodiment is a data-active state in which the first signal configuration is detected among the plurality of auxiliary signals, and the first data signals are detected at an input of the transmitter, wherein data is transmitted optically over the optical link during the data-active state.

The data-active state of an embodiment comprises a state in which an output of the transmitter is enabled and an output of the receiver is enabled.

Embodiments described herein include a device comprising a transmitter coupled to an optical link comprising a plurality of optical channels. The transmitter operating in a first state converts first data signals to first optical signals and outputs the first optical signals to the optical link. The transmitter operating in a second state converts first auxiliary electrical signals to first auxiliary optical signals and outputs the first auxiliary optical signals to the optical link. The device includes a receiver coupled to the optical link. The receiver operating in the first state converts second optical signals received over the optical link to second data signals. The receiver operating in the second state converts second auxiliary optical signals received over the optical link to second auxiliary electrical signals. A plurality of auxiliary signals comprises the first auxiliary electrical signals and the second auxiliary electrical signals. The device includes a controller coupled to the transmitter and the receiver. The controller controls the transmitter and the receiver to operate in the first state when a first signal configuration is detected among the plurality of auxiliary electrical signals, and controls the transmitter and the receiver to operate in the second state when a second signal configuration is detected among the plurality of auxiliary electrical signals.

Embodiments described herein include a device comprising: a transmitter coupled to an optical link comprising a plurality of optical channels, wherein the transmitter operating in a first state converts first data signals to first optical signals and outputs the first optical signals to the optical link, wherein the transmitter operating in a second state converts first auxiliary electrical signals to first auxiliary optical signals and outputs the first auxiliary optical signals to the optical link; a receiver coupled to the optical link, wherein the receiver operating in the first state converts second optical signals received over the optical link to second data signals, wherein the receiver operating in the second state converts second auxiliary optical signals received over the optical link to second auxiliary electrical signals, wherein a plurality of auxiliary signals comprises the first auxiliary electrical signals and the second auxiliary electrical signals; and a controller coupled to the transmitter and the receiver, wherein the controller controls the transmitter and the receiver to operate in the first state when a first signal configuration is detected among the plurality of auxiliary electrical signals, and controls the transmitter and the receiver to operate in the second state when a second signal configuration is detected among the plurality of auxiliary electrical signals.

Embodiments described herein include a method comprising coupling a transmitter to a first end of an optical link that includes a plurality of optical channels. The method includes coupling a receiver to the first end of the optical link. A data transport system comprises the transmitter, the receiver and the optical link. The method includes coupling a controller to the transmitter and the receiver. The method includes controlling the transmitter and the receiver to operate in a first state when data are detected at an input of the transmitter. The method includes transporting data via the data transport system in the first state. The method includes controlling the transmitter and the receiver to operate in a second state when the data are detected as absent at the input of the transmitter. The method includes preventing data from being transported via the data transport system in the second state.

Embodiments described herein include a method comprising: coupling a transmitter to a first end of an optical link that includes a plurality of optical channels; coupling a receiver to the first end of the optical link, wherein a data transport system comprises the transmitter, the receiver and the optical link; coupling a controller to the transmitter and the receiver; controlling the transmitter and the receiver to operate in a first state when data are detected at an input of the transmitter; transporting data via the data transport system in the first state; controlling the transmitter and the receiver to operate in a second state when the data are detected as absent at the input of the transmitter; and preventing data from being transported via the data transport system in the second state.

The method comprises coupling a detector between an input of the transmitter and the controller, a measuring with the detector a parameter of input signals present at the input and outputs a detector signal representative of the parameter.

The first state comprises a state in which an output of the transmitter is enabled and an output of the receiver is enabled.

The second state is an electrical idle state, wherein the controller detects the electrical idle state using the detector signal.

The electrical idle state comprises a state in which an output of the transmitter is disabled, an output of the receiver is enabled, and internal squelches coupled to each receiver output channel are enabled, and the controller is monitoring for the data at the input of the transmitter.

In response to detecting the electrical idle state the controller disables an output of the transmitter.

The controller disables the output of the transmitter by toggling at least one bit of a driver control signal in violation of a driver control signal protocol, wherein an output of at least one driver of the transmitter is disabled, wherein no light is transmitted over the optical channel when the driver is disabled.

In response to detecting the electrical idle state the controller enables at least one output of the receiver.

In response to detecting the electrical idle state the receiver enables at least one internal squelch of at least one receiver channel.

The controller disables an output of at least one driver of the transmitter when an absence of light is detected on at least one output channel of the optical link.

The controller uses a write-ahead protocol to reduce a delay resulting from control of the transmitter.

The second state is an auxiliary state in which a plurality of auxiliary signals comprising status and control signals is transported via the data transport system.

The auxiliary state comprises a state in which an output of the transmitter is selectively enabled and disabled as appropriate to generate at least one signal configuration of the auxiliary state, an output of the receiver is disabled, internal squelches coupled to each receiver output channel are selectively enabled and disabled as appropriate to the at least one signal configuration of the auxiliary state, monitoring for light at an input of the receiver is enabled, and monitoring for the data at the input of the transmitter by the controller is disabled.

The method comprises controlling the transmitter and the receiver with the controller to operate in the first state when a first signal configuration is detected among the plurality of auxiliary signals.

The method comprises, controlling the transmitter and the receiver with the controller to operate in the second state when a second signal configuration is detected among the plurality of auxiliary signals.

The first signal configuration comprises a first code that indicates the transmitter and the receiver are properly configured to transport the data, wherein the first code is represented by combined states of the plurality of auxiliary signals.

The second signal configuration comprises a second code that indicates the transmitter and the receiver are improperly configured to transport the data, wherein the second code is represented by the combined states of the plurality of auxiliary signals and is different than the first code.

The transmitter comprises a plurality of channels and a plurality of drivers corresponding to the plurality of channels, wherein the controller selectively deactivates the plurality of drivers to generate the first code and the second code.

The transmitter comprises a plurality of channels, wherein each channel includes a driver.

The method comprises coupling the detector between an input of at least one channel and the controller, wherein the detector measures a parameter of input signals present at the input and outputs a detector signal representative of the parameter, wherein the controller compares the detector signal to a reference and uses the result of the comparison to determine when the data is present at the input of the transmitter.

The method comprises coupling a driver control signal between the controller and the driver, wherein the controller via the driver control signal enables a driver output of the driver when the data is detected at the input of the transmitter.

The controller, when the driver output is disabled, writes ahead an initial portion of the driver control signal, and writes a final portion of the driver control signal when the data is detected at the input of the transmitter.

The controller via the driver control signal disables the driver output when the data is detected as absent at the input of the transmitter.

The controller disables the driver outputs of the transmitter when the controller detects at the receiver an absence of light received over the optical link.

The controller disables the driver output by toggling at least one bit of the driver control signal in violation of a driver control signal protocol, wherein no light is transmitted over the optical channel when the driver output is disabled.

The second state is an auxiliary state in which a plurality of auxiliary signals comprising status and control signals are transported over the optical link, wherein the transmitter comprises at least one light-emitting device for transmitting the data over the optical link, wherein the receiver comprises at least one light-detecting device for receiving optical signals over the optical link.

The transmitter operating in the first state converts first data signals to first optical signals and outputs the first optical signals to the optical link.

The receiver operating in the first state converts second optical signals received over the optical link to second data signals.

The transmitter operating in the second state converts first auxiliary electrical signals to first auxiliary optical signals and outputs the first auxiliary optical signals to the optical link.

The receiver operating in the second state converts second auxiliary optical signals received over the optical link to second auxiliary electrical signals.

The data comprises first data signals and second data signals, and wherein the plurality of auxiliary signals comprises first auxiliary signals and second auxiliary signals.

The data and the auxiliary signals are compatible with a Peripheral Component Interconnect (PCI) Express (PCIe) protocol.

The transmitter operates in the first state to transport the first data signals over the optical link and operates in the second state to transport the first auxiliary signals over the optical link.

The receiver operates in the first state to receive the second data signals over the optical link and operates in the second state to receive the second auxiliary signals over the optical link.

The controller controls the transmitter and the receiver to operate in the first state when a first signal configuration is detected among the plurality of auxiliary signals, and controls the transmitter and the receiver to operate in the second state when a second signal configuration is detected among the plurality of auxiliary signals.

The first signal configuration comprises at least one first code that indicates the transmitter and the receiver are properly configured to transport the data, wherein the at least one first code is represented by combined states of the plurality of auxiliary signals.

The second signal configuration comprises at least one second code that indicates the transmitter and the receiver are improperly configured to transport the data, wherein the at least one second code is represented by the combined states of the plurality of auxiliary signals and is different than the first code.

The transmitter comprises a plurality of channels and a plurality of drivers corresponding to the plurality of channels, wherein the controller selectively deactivates driver outputs of the plurality of drivers to generate the at least one first code and the at least one second code.

The at least one first code is a member of a first code set, wherein the first code set includes a first plurality of binary codes.

The first plurality of binary codes comprises at least one of 0000, 0001, 0011, 1000, 1100, and 1111.

The at least one second code is a member of a second code set, wherein the second code set includes a second plurality of binary codes.

The second plurality of binary codes comprises at least one of 1001, 1011, 1101, and 1110.

The second plurality of binary codes further comprises at least one of 0111, 0110, 0010, 0100, 0101, and 1010.

The plurality of auxiliary signals is auxiliary signals of a PCIe protocol, and the second plurality of binary codes corresponds to at least one auxiliary signal of the plurality of auxiliary signals.

The binary code 1001 corresponds to a platform reset signal in a low logic state and a power on signal in a low logic state.

The binary code 1011 corresponds to a platform reset signal in a low logic state and a power on signal in a high logic state.

The binary code 1101 corresponds to a platform reset signal in a high logic state and a power on signal in a low logic state.

The binary code 1110 corresponds to a platform reset signal in a high logic state and a power on signal in a high logic state.

The binary code 1001 corresponds to a present signal in a low logic state and a wake signal in a low logic state.

The binary code 1011 corresponds to a present signal in a low logic state and a wake signal in a high logic state.

The binary code 1101 corresponds to a present signal in a high logic state and a wake signal in a low logic state.

The binary code 1110 corresponds to a present signal in a high logic state and a wake signal in a high logic state.

The plurality of auxiliary signals is auxiliary signals of a PCIe protocol.

The plurality of auxiliary signals include at least one of a present signal, a wake signal, a platform reset signal, and a power on signal.

The method comprises transmitting the present signal to indicate the data transport system is present on the optical link, transmitting the wake signal to command a receiving device to awaken, transmitting the platform reset signal to indicate a power state and a reset state of the data transport system, and transmitting the power on signal by a host to notify a target that host power is present.

The first auxiliary electrical signals comprise the present signal and the wake signal, and the second auxiliary electrical signals comprise the platform reset signal and the power on signal.

The first auxiliary electrical signals comprise the platform reset signal and the power on signal, and the second auxiliary electrical signals comprise the present signal and the wake signal.

The transmitter comprises a plurality of channels and a plurality of drivers, wherein each channel includes a driver, and comprising a detector coupled between an input of at least one driver and the controller, wherein the detector measures a parameter of input signals present at the input and outputs a detector signal representative of the parameter.

The controller compares the detector signal to a reference and uses the result of the comparison to determine when data is present at the input of the at least one driver.

The method comprises coupling a driver control signal between the controller and the at least one driver, wherein the controller via the driver control signal enables at least one driver output of the at least one driver when the data is detected at the input of the at least one driver.

The method comprises coupling the driver control signal between the controller and a plurality of drivers of the transmitter, wherein the controller via the driver control signal enables a plurality of driver outputs of the plurality of drivers when the data is detected at the input of the at least one driver.

The controller, when the at least one driver output is disabled, writes ahead an initial portion of the driver control signal, and writes a final portion of the driver control signal when the data signal is detected at the input of the transmitter.

The controller via the driver control signal disables the at least one driver output when the data is detected as absent at the input of the at least one driver.

The controller disables the at least one driver output when the controller detects at the receiver an absence of light received over the optical link.

The controller disables the at least one driver output by toggling at least one bit of the driver control signal in violation of a driver control signal protocol, wherein no light is transmitted over the optical channel when the at least one driver output is disabled.

The controller via the driver control signal disables a plurality of driver outputs of the transmitter when the data is detected as absent at the input of the at least one driver.

The auxiliary state comprises a state in which an output of the transmitter is selectively enabled and disabled as appropriate to generate at least one signal configuration of the auxiliary state, an output of the receiver is disabled, internal squelches coupled to each receiver output channel are selectively enabled and disabled as appropriate to the at least one signal configuration of the auxiliary state, monitoring for light at an input of the receiver is enabled, and monitoring for the data at the input of the transmitter by the controller is disabled.

The first state comprises a plurality of sub-states.

A first sub-state is a data-idle state in which the first signal configuration is detected among the plurality of auxiliary signals, and the first data signals are absent at an input of the transmitter, wherein no data is transmitted over the optical link during the data-idle state.

The data-idle state comprises a state in which an output of the transmitter is disabled, an output of the receiver is enabled, internal squelches coupled to each receiver output channel are enabled, and the controller is monitoring for the data at the input of the transmitter.

A second sub-state is a data-active state in which the first signal configuration is detected among the plurality of auxiliary signals, and the first data signals are detected at an input of the transmitter, wherein data is transmitted optically over the optical link during the data-active state.

The data-active state comprises a state in which an output of the transmitter is enabled and an output of the receiver is enabled.

Embodiments described herein include a method comprising coupling a transmitter to a first end of an optical link that includes a plurality of optical channels. The method includes coupling a receiver to the first end of the optical link. A data transport system comprises the transmitter, the receiver and the optical link. The method includes coupling a controller to the transmitter and the receiver. The method includes coupling a detector between an input of the transmitter and the controller. The method includes generating a detector signal representative of a parameter of a signal at the input. The method includes detecting an idle state using the detector signal and in response disabling data transmission over the data transport system.

Embodiments described herein include a method comprising: coupling a transmitter to a first end of an optical link that includes a plurality of optical channels; coupling a receiver to the first end of the optical link, wherein a data transport system comprises the transmitter, the receiver and the optical link; coupling a controller to the transmitter and the receiver; coupling a detector between an input of the transmitter and the controller; generating a detector signal representative of a parameter of a signal at the input; and detecting an idle state using the detector signal and in response disabling data transmission over the data transport system.

The idle state comprises a state during which data are detected as absent at the input of the transmitter.

The disabling of the data transmission comprises disabling an output of the transmitter.

The controller controls disabling of the output of the transmitter using a control signal coupled to the transmitter, wherein the control signal is configured to reduce delay resulting from control of the output.

The controller disables the output by toggling at least one bit of the control signal in violation of a control signal protocol, wherein light transmission over the optical link is prevented when the output is disabled.

The controller enables the output using a write-ahead technique applied to the control signal.

The transmitter comprises a plurality of channels and a plurality of drivers, wherein each channel includes a driver.

The method comprises coupling the detector between the controller and at least one channel of the plurality of channels, measuring with the detector the parameter of the signal present on the at least one channel, comparing with the controller the detector signal to a reference and using the result of the comparison to determine when the data is absent at the input of the transmitter.

The method comprises coupling a driver control signal between the controller and the driver, and disabling via the driver control signal an output of the driver when the data is detected as absent at the input of the transmitter.

The controller disables an output of the driver by toggling at least one bit of the driver control signal in violation of a driver control signal protocol, wherein no light is transmitted over the optical channel when the driver output is disabled.

The disabling of the data transmission comprises squelching an output of the receiver using an internal squelch of the receiver.

The idle state comprises a state in which an output of the transmitter is disabled, an output of the receiver is enabled, and internal squelches coupled to each receiver output channel are enabled, and the controller is monitoring for the data at the input of the transmitter.

The method comprises disabling an output of the transmitter when the controller detects at the receiver an absence of light received over the optical link.

The controller controls the transmitter to operate in a data state when data are detected at the input of the transmitter, wherein data are transported via the data transport system in the data state.

The controller controls the receiver to operate in a data state when data are detected at the input of the transmitter.

The data state comprises a state in which an output of the transmitter is enabled and an output of the receiver is enabled.

The transmitter comprises a plurality of channels, wherein each channel includes a driver, wherein the detector is coupled between the controller and at least one channel of the plurality of channels, wherein the detector measures the parameter of the signal present on the at least one channel and the controller compares the detector signal to a reference and uses the result of the comparison to determine when data is present at the input of the transmitter.

The method comprises coupling a driver control signal between the controller and the driver, wherein the controller via the driver control signal enables an output of the driver when the data is detected at the input of the transmitter.

The controller, when the output of the driver is disabled, writes ahead an initial portion of the driver control signal, and writes a final portion of the driver control signal when the data signal is detected at the input of the transmitter.

The controller controls the transmitter and receiver to operate in the data state when a first signal configuration is detected among a plurality of auxiliary signals.

The controller controls the transmitter and the receiver to operate in an auxiliary state when a second signal configuration is detected among the plurality of auxiliary signals The auxiliary state comprises a state in which a plurality of auxiliary signals comprising status and control signals are transported via the data transport system, wherein the transport of the auxiliary signals is performed using a same set of channels as the channels used for transport of the data.

The first signal configuration comprises at least one first code that indicates the transmitter and the receiver are properly configured to transport the data, wherein the at least one first code is represented by combined states of the plurality of auxiliary signals.

The second signal configuration comprises at least one second code that indicates the transmitter and the receiver are improperly configured to transport the data, wherein the at least one second code is represented by the combined states of the plurality of auxiliary signals and is different than the first code.

The transmitter comprises a plurality of channels and a plurality of drivers corresponding to the plurality of channels, wherein the controller selectively enables and disables the plurality of drivers to generate the at least one first code and the at least one second code.

The transmitter operating in the data state converts first data signals to first optical signals and outputs the first optical signals to the optical link.

The transmitter comprises at least one light-emitting device for transmitting the data over the optical link, wherein the receiver comprises at least one light-detecting device for receiving optical signals over the optical link.

The receiver operating in the data state converts second optical signals received over the optical link to second data signals.

The transmitter operating in the auxiliary state converts first auxiliary electrical signals to first auxiliary optical signals and outputs the first auxiliary optical signals to the optical link.

The receiver operating in the auxiliary state converts second auxiliary optical signals received over the optical link to second auxiliary electrical signals.

The data comprises first data signals and second data signals, and wherein the plurality of auxiliary signals comprises first auxiliary signals and second auxiliary signals.

The data and the auxiliary signals are compatible with a Peripheral Component Interconnect (PCI) Express (PCIe) protocol.

The transmitter operates in the data state to transport the first data signals over the optical link and operates in the auxiliary state to transport the first auxiliary signals over the optical link.

The receiver operates in the data state to receive the second data signals over the optical link and operates in the auxiliary state to receive the second auxiliary signals over the optical link.

The at least one first code is a member of a first code set, wherein the first code set includes a first plurality of binary codes.

The first plurality of binary codes comprises at least one of 0000, 0001, 0011, 1000, 1100, and 1111.

The at least one second code is a member of a second code set, wherein the second code set includes a second plurality of binary codes.

The second plurality of binary codes comprises at least one of 1001, 1011, 1101, and 1110.

The second plurality of binary codes comprises at least one of 0111, 0110, 0010, 0100, 0101, and 1010.

The plurality of auxiliary signals is auxiliary signals of a PCIe protocol, and the second plurality of binary codes corresponds to at least one auxiliary signal of the plurality of auxiliary signals.

The binary code 1001 corresponds to a platform reset signal in a low logic state and a power on signal in a low logic state.

The binary code 1011 corresponds to a platform reset signal in a low logic state and a power on signal in a high logic state.

The binary code 1101 corresponds to a platform reset signal in a high logic state and a power on signal in a low logic state.

The binary code 1110 corresponds to a platform reset signal in a high logic state and a power on signal in a high logic state.

The binary code 1001 corresponds to a present signal in a low logic state and a wake signal in a low logic state.

The binary code 1011 corresponds to a present signal in a low logic state and a wake signal in a high logic state.

The binary code 1101 corresponds to a present signal in a high logic state and a wake signal in a low logic state.

The binary code 1110 corresponds to a present signal in a high logic state and a wake signal in a high logic state.

The plurality of auxiliary signals is auxiliary signals of a PCIe protocol.

The plurality of auxiliary signals include at least one of a present signal, a wake signal, a platform reset signal, and a power on signal.

The method comprises transmitting the present signal to indicate a transmitting device is present on the optical link, comprising transmitting the wake signal to command a receiving device to awaken, comprising transmitting the platform reset signal to indicate a power state and a reset state of the transmitting device, comprising transmitting the power on signal by a host to notify a target that host power is present.

The first auxiliary electrical signals comprise the present signal and the wake signal, and the second auxiliary electrical signals comprise the platform reset signal and the power on signal.

The first auxiliary electrical signals comprise the platform reset signal and the power on signal, and the second auxiliary electrical signals comprise the present signal and the wake signal.

Embodiments described herein include a method comprising coupling a transmitter to an optical link comprising a plurality of optical channels. The method includes operating the transmitter in a first state to transport first data signals over the optical link and operating the transmitter in a second state to transport first auxiliary signals over the optical link. The method includes coupling a receiver to the optical link. The method includes operating the receiver in the first state to receive second data signals over the optical link and operating the receiver in the second state to receive second auxiliary signals over the optical link. A plurality of auxiliary signals comprises the first auxiliary signals and the second auxiliary signals. The method includes coupling a controller to the transmitter and the receiver and controlling the transmitter and the receiver to operate in the first state when a first signal configuration is detected among the plurality of auxiliary signals. The method includes controlling the transmitter and the receiver to operate in the second state when a second signal configuration is detected among the plurality of auxiliary signals.

Embodiments described herein include a method comprising: coupling a transmitter to an optical link comprising a plurality of optical channels, and operating the transmitter in a first state to transport first data signals over the optical link and operating the transmitter in a second state to transport first auxiliary signals over the optical link; coupling a receiver to the optical link, and operating the receiver in the first state to receive second data signals over the optical link and operating the receiver in the second state to receive second auxiliary signals over the optical link, wherein a plurality of auxiliary signals comprises the first auxiliary signals and the second auxiliary signals; and coupling a controller to the transmitter and the receiver and controlling the transmitter and the receiver to operate in the first state when a first signal configuration is detected among the plurality of auxiliary signals, and controlling the transmitter and the receiver to operate in the second state when a second signal configuration is detected among the plurality of auxiliary signals.

The first state is a data state in which data are transported over the optical link, and the second state is an auxiliary state in which status and control signals are transported over the optical link.

The transmitter operating in the first state converts first data signals to first optical signals and outputs the first optical signals to the optical link.

The transmitter comprises at least one light-emitting device for transmitting the data over the optical link, wherein the receiver comprises at least one light-detecting device for receiving optical signals over the optical link.

The receiver operating in the first state converts second optical signals received over the optical link to second data signals.

The transmitter operating in the second state converts first auxiliary electrical signals to first auxiliary optical signals and outputs the first auxiliary optical signals to the optical link.

The receiver operating in the second state converts second auxiliary optical signals received over the optical link to second auxiliary electrical signals.

The data and the auxiliary signals are compatible with a Peripheral Component Interconnect (PCI) Express (PCIe) protocol.

The first signal configuration comprises at least one first code that indicates the transmitter and the receiver are properly configured to transport the data, wherein the at least one first code is represented by combined states of the plurality of auxiliary signals.

The second signal configuration comprises at least one second code that indicates the transmitter and the receiver are improperly configured to transport the data, wherein the at least one second code is represented by the combined states of the plurality of auxiliary signals and is different than the first code.

The transmitter comprises a plurality of channels and a plurality of drivers corresponding to the plurality of channels, wherein the controller selectively enables and disables at least one driver output of the plurality of drivers to generate the at least one first code and the at least one second code.

The at least one first code is a member of a first code set, wherein the first code set includes a first plurality of binary codes.

The first plurality of binary codes comprises at least one of 0000, 0001, 0011, 1000, 1100, and 1111.

The at least one second code is a member of a second code set, wherein the second code set includes a second plurality of binary codes.

The second plurality of binary codes comprises at least one of 1001, 1011, 1101, and 1110.

The second plurality of binary codes further comprises at least one of 0111, 0110, 0010, 0100, 0101, and 1010.

The plurality of auxiliary signals is auxiliary signals of the PCIe protocol, and the second plurality of binary codes corresponds to at least one auxiliary signal of the plurality of auxiliary signals.

The binary code 1001 corresponds to a platform reset signal in a low logic state and a power on signal in a low logic state.

The binary code 1011 corresponds to a platform reset signal in a low logic state and a power on signal in a high logic state.

The binary code 1101 corresponds to a platform reset signal in a high logic state and a power on signal in a low logic state.

The binary code 1110 corresponds to a platform reset signal in a high logic state and a power on signal in a high logic state.

The binary code 1001 corresponds to a present signal in a low logic state and a wake signal in a low logic state.

The binary code 1011 corresponds to a present signal in a low logic state and a wake signal in a high logic state.

The binary code 1101 corresponds to a present signal in a high logic state and a wake signal in a low logic state.

The binary code 1110 corresponds to a present signal in a high logic state and a wake signal in a high logic state.

The plurality of auxiliary signals is auxiliary signals of the PCIe protocol.

The plurality of auxiliary signals include at least one of a present signal, a wake signal, a platform reset signal, and a power on signal.

The method comprises transmitting the present signal to indicate a transmitting device is present on the optical link, transmitting the wake signal to command a receiving device to awaken, transmitting the platform reset signal to indicate a power state and a reset state of the transmitting device, and transmitting the power on signal by a host to notify a target that host power is present.

The first auxiliary electrical signals comprise the present signal and the wake signal, and the second auxiliary electrical signals comprise the platform reset signal and the power on signal.

The first auxiliary electrical signals comprise the platform reset signal and the power on signal, and the second auxiliary electrical signals comprise the present signal and the wake signal.

The first state comprises a state in which an output of the transmitter is enabled and an output of the receiver is enabled.

The second state comprises a state in which an output of the transmitter is selectively enabled and disabled based on the first signal configuration and the second signal configuration, the output of the receiver is disabled, internal squelches coupled to each receiver output channel are selectively enabled and disabled as appropriate to the first signal configuration and the second signal configuration, monitoring for light at an input of the receiver is enabled, and monitoring for the data at the input of the transmitter by the controller is disabled.

The transmitter comprises a plurality of channels and a plurality of drivers, wherein each channel includes a driver.

The method comprises coupling a detector between an input of at least one driver and the controller, and measuring with the detector a parameter of the first data signals present at the input and outputs a detector signal representative of the parameter.

The method comprises comparing with the controller the detector signal to a reference and uses the result of the comparison to determine when a data signal is present at the input of the at least one driver.

The method comprises coupling a driver control signal between the controller and the at least one driver, wherein the controller via the driver control signal enables at least one driver output of the at least one driver when the data signal is detected at the input of the transmitter.

The controller, when the at least one driver output is disabled, enables the at least one driver output by writing ahead an initial portion of the driver control signal, and writing a final portion of the driver control signal when the data signal is detected at the input of the transmitter.

The controller via the driver control signal disables the at least one driver output when the data signal is detected as absent at the input of the at least one driver.

The controller disables the at least one driver output by toggling at least one bit of the driver control signal in violation of a driver control signal protocol, wherein no light is transmitted over the optical channel when the at least one driver output is disabled.

The controller disables the at least one driver output when the controller detects at the receiver an absence of light received over the optical link.

The receiver enables at least one internal squelch of at least one receiver output channel when an absence of light is detected on a corresponding channel of the optical link.

The first state comprises a plurality of sub-states.

A first sub-state is a data-idle state in which the first signal configuration is detected among the plurality of auxiliary signals, and the first data signals are absent at an input of the transmitter, wherein no data is transmitted over the optical link during the data-idle state.

The data-idle state comprises a state in which an output of the transmitter is disabled, an output of the receiver is enabled, internal squelches coupled to each receiver output channel are enabled, and the controller is monitoring for the data at the input of the transmitter.

A second sub-state is a data-active state in which the first signal configuration is detected among the plurality of auxiliary signals, and the first data signals are detected at an input of the transmitter, wherein data is transmitted optically over the optical link during the data-active state.

The data-active state comprises a state in which an output of the transmitter is enabled and an output of the receiver is enabled.

Embodiments described herein include a method comprising coupling a transmitter to an optical link comprising a plurality of optical channels. The method includes operating the transmitter in a first state to convert first data signals to first optical signals and output the first optical signals to the optical link. The method includes operating the transmitter in a second state to convert first auxiliary electrical signals to first auxiliary optical signals and output the first auxiliary optical signals to the optical link. The method includes coupling a receiver to the optical link. The method includes operating the receiver in the first state to convert second optical signals received over the optical link to second data signals. The method includes operating the receiver in the second state to convert second auxiliary optical signals received over the optical link to second auxiliary electrical signals. A plurality of auxiliary signals comprises the first auxiliary electrical signals and the second auxiliary electrical signals. The method includes coupling a controller to the transmitter and the receiver and controlling the transmitter and the receiver to operate in the first state when a first signal configuration is detected among the plurality of auxiliary electrical signals. The method includes controlling the transmitter and the receiver to operate in the second state when a second signal configuration is detected among the plurality of auxiliary electrical signals.

Embodiments described herein include a method comprising: coupling a transmitter to an optical link comprising a plurality of optical channels, and operating the transmitter in a first state to convert first data signals to first optical signals and output the first optical signals to the optical link, and operating the transmitter in a second state to convert first auxiliary electrical signals to first auxiliary optical signals and output the first auxiliary optical signals to the optical link; coupling a receiver to the optical link, and operating the receiver in the first state to convert second optical signals received over the optical link to second data signals, and operating the receiver in the second state to convert second auxiliary optical signals received over the optical link to second auxiliary electrical signals, wherein a plurality of auxiliary signals comprises the first auxiliary electrical signals and the second auxiliary electrical signals; and coupling a controller to the transmitter and the receiver and controlling the transmitter and the receiver to operate in the first state when a first signal configuration is detected among the plurality of auxiliary electrical signals, and controlling the transmitter and the receiver to operate in the second state when a second signal configuration is detected among the plurality of auxiliary electrical signals.

Embodiments described herein include a method for data transport, the method comprising detecting an input signal parameter at a transmitter at a first end of an optical link. The method comprises outputting a control signal representative of the input signal parameter. The method comprises controlling a state of the transmitter and a receiver at the first end of the optical link in response to the control signal. The state includes a first state when data is detected at the transmitter and a second state when the data is detected as absent at the transmitter. The method comprises transporting the data over the optical link when the state is the first state. The method comprises preventing the transporting of the data over the optical link when the state is the second state.

Embodiments described herein include a method for data transport, the method comprising: detecting an input signal parameter at a transmitter at a first end of an optical link; outputting a control signal representative of the input signal parameter; controlling a state of the transmitter and a receiver at the first end of the optical link in response to the control signal, wherein the state includes a first state when data is detected at the transmitter and a second state when the data is detected as absent at the transmitter; transporting the data over the optical link when the state is the first state; and preventing the transporting of the data over the optical link when the state is the second state.

Embodiments described herein include a method for data transport, the method comprising coupling a transmitter and a receiver to a controller and a first end of an optical link that includes a plurality of optical channels. The method comprises measuring an input signal parameter at the transmitter using a detector coupled between the transmitter and the controller. The method comprises outputting a control signal representative of the input signal parameter. The method comprises controlling the transmitter and the receiver to operate in a first state when the detector signal indicates data are detected at the transmitter. In the first state data are transported via the optical link. The method comprises controlling the transmitter and the receiver to operate in a second state when the detector signal indicates data are absent at the transmitter. In the second state data are prevented from being transported via the optical link.

Embodiments described herein include a method for data transport, the method comprising: coupling a transmitter and a receiver to a controller and a first end of an optical link that includes a plurality of optical channels; measuring an input signal parameter at the transmitter using a detector coupled between the transmitter and the controller; outputting a control signal representative of the input signal parameter; controlling the transmitter and the receiver to operate in a first state when the detector signal indicates data are detected at the transmitter, wherein in the first state data are transported via the optical link; and controlling the transmitter and the receiver to operate in a second state when the detector signal indicates data are absent at the transmitter, wherein in the second state data are prevented from being transported via the optical link.

Embodiments described herein include a data transport system comprising a transmitter coupled to an optical link comprising a plurality of optical channels. The transmitter operates in a first state to transport first data signals over the optical link and operates in a second state to transport first auxiliary signals over the optical link. The data transport system comprises a receiver coupled to the optical link. The receiver operates in the first state to receive second data signals over the optical link and operates in the second state to receive second auxiliary signals over the optical link. A plurality of auxiliary signals comprises the first auxiliary signals and the second auxiliary signals. The data transport system comprises a controller coupled to the transmitter and the receiver. The controller controls the transmitter and the receiver to operate in the first state when a first signal configuration is detected among the plurality of auxiliary signals, and controls the transmitter and the receiver to operate in the second state when a second signal configuration is detected among the plurality of auxiliary signals. The data transport system comprises a detector coupled between an input of the transmitter and the controller. The detector outputs a detector signal representative of a parameter of a signal at the input. The controller detects an idle state using the detector signal and in response disables data transmission over the data transport system.

Embodiments described herein include a data transport system comprising: a transmitter coupled to an optical link comprising a plurality of optical channels, wherein the transmitter operates in a first state to transport first data signals over the optical link and operates in a second state to transport first auxiliary signals over the optical link; a receiver coupled to the optical link, wherein the receiver operates in the first state to receive second data signals over the optical link and operates in the second state to receive second auxiliary signals over the optical link, wherein a plurality of auxiliary signals comprises the first auxiliary signals and the second auxiliary signals; a controller coupled to the transmitter and the receiver, wherein the controller controls the transmitter and the receiver to operate in the first state when a first signal configuration is detected among the plurality of auxiliary signals, and controls the transmitter and the receiver to operate in the second state when a second signal configuration is detected among the plurality of auxiliary signals; and a detector coupled between an input of the transmitter and the controller, wherein the detector outputs a detector signal representative of a parameter of a signal at the input, wherein the controller detects an idle state using the detector signal and in response disables data transmission over the data transport system.

Embodiments described herein include a data transport system comprising a transmitter and a receiver coupled to a first end of an optical link. The optical link includes a plurality of optical channels. The data transport system comprises a controller coupled to the transmitter and the receiver. The data transport system comprises a detector coupled between the transmitter and the controller. The detector measures a parameter of input signals at the transmitter and outputs a detector signal representative of the parameter. The controller controls the transmitter and the receiver to operate in a first state when the detector signal indicates data are detected at the transmitter, and to operate in a second state when the data are detected as absent at the transmitter. Data are transported via the data transport system in the first state and data are prevented from being transported via the data transport system in the second state.

Embodiments described herein include a data transport system comprising: a transmitter and a receiver coupled to a first end of an optical link, wherein the optical link includes a plurality of optical channels; a controller coupled to the transmitter and the receiver; and a detector coupled between the transmitter and the controller; wherein the detector measures a parameter of input signals at the transmitter and outputs a detector signal representative of the parameter; wherein the controller controls the transmitter and the receiver to operate in a first state when the detector signal indicates data are detected at the transmitter, and to operate in a second state when the data are detected as absent at the transmitter, wherein data are transported via the data transport system in the first state and data are prevented from being transported via the data transport system in the second state.

One or more components of the interface system and/or a corresponding system or application to which the interface system is coupled or connected include and/or run under and/or in association with a processing system. The processing system includes any collection of processor-based devices or computing devices operating together, or components of processing systems or devices, as is known in the art. The processing system of an embodiment includes at least one processor. The term “processor” as generally used herein refers to any logic processing unit, such as one or more central processing units (CPUs), digital signal processors (DSPs), application-specific integrated circuits (ASIC), etc. The methods described herein can be implemented in one or more of software algorithm(s), programs, firmware, hardware, components, circuitry, in any combination. The components of any system that includes the interface system can be located together or in separate locations. Communication paths couple the components and include any medium for communicating or transferring files among the components.

Unless the context clearly requires otherwise, throughout the description and the claims, the words “comprise,” “comprising,” and the like are to be construed in an inclusive sense as opposed to an exclusive or exhaustive sense; that is to say, in a sense of “including, but not limited to.” Words using the singular or plural number also include the plural or singular number respectively. Additionally, the words “herein,” “hereunder,” “above,” “below,” and words of similar import, when used in this application, refer to this application as a whole and not to any particular portions of this application. When the word “or” is used in reference to a list of two or more items, that word covers all of the following interpretations of the word: any of the items in the list, all of the items in the list and any combination of the items in the list.

The above description of embodiments of the interface system and corresponding systems and methods is not intended to be exhaustive or to limit the systems and methods to the precise forms disclosed. While specific embodiments of, and examples for, the interface system and corresponding systems and methods are described herein for illustrative purposes, various equivalent modifications are possible within the scope of the systems and methods, as those skilled in the relevant art will recognize. The teachings of the interface system and corresponding systems and methods provided herein can be applied to other systems and methods, not only for the systems and methods described above. The elements and acts of the various embodiments described above can be combined to provide further embodiments. These and other changes can be made to the interface system and corresponding systems and methods in light of the above detailed description.

In general, in the following claims, the terms used should not be construed to limit the interface system and corresponding systems and methods to the specific embodiments disclosed in the specification and the claims, but should be construed to include all systems that operate under the claims. Accordingly, the interface system and corresponding systems and methods is not limited by the disclosure, but instead the scope is to be determined entirely by the claims. While certain aspects of the interface system and corresponding systems and methods are presented below in certain claim forms, the inventors contemplate the various aspects of the interface system and corresponding systems and methods in any number of claim forms. Accordingly, the inventors reserve the right to add additional claims after filing the application to pursue such additional claim forms for other aspects of the interface system and corresponding systems and methods.

What is claimed is:

1. A device comprising:

an optical link including optical channels;

a transmitter coupled to the optical link;

a receiver coupled to the optical link; and a controller coupled to the transmitter and the receiver; wherein a first auxiliary signal configuration is defined by values of one or more first auxiliary signals and of one or more second auxiliary signals;

a second auxiliary signal configuration is defined by other values of the one or more first auxiliary signals and of the one or more second auxiliary signals; and when the device is on, the controller controls:

when the controller detects the first auxiliary signal configuration, the transmitter and the receiver in a first state in which the transmitter is controlled to be capable of transmitting one or more first data signals and in which the receiver is controlled to be capable of receiving one or more second data signals;

when the controller detects the second auxiliary signal configuration, the transmitter and the receiver in a second state in which data transmission and data reception are disabled;

the transmitter to continuously transmit the one or more first auxiliary signals over the optical link in the first and the second states; and the receiver to continuously receive the one or more second auxiliary signals over the optical link in the first and the second states.

2. The device of claim 1, wherein the first state is a data state, and the second state is an auxiliary state in which status and control signals are transported over the optical link.

3. The device of claim 2, wherein the transmitter operating in the first state converts the one or more first data signals to one or more first optical signals and outputs the one or more first optical signals to the optical link.

4. The device of claim 3, wherein the transmitter comprises at least one light-emitting device, wherein the receiver comprises at least one light-detecting device.

5. The device of claim 3, wherein the receiver operating in the first state converts one or more second optical signals received over the optical link to the one or more second data signals.

6. The device of claim 5, wherein the transmitter operating in the second state converts the one or more first auxiliary signals to one or more first auxiliary optical signals and outputs the one or more first auxiliary optical signals to the optical link.

7. The device of claim 6, wherein the receiver operating in the second state converts one or more second auxiliary optical signals received over the optical link to the one or more second auxiliary signals.

8. The device of claim 1, wherein the one or more first data signals and the one or more second data signals, the one or more first auxiliary signals, and the one or more second auxiliary signals are compatible with a Peripheral Component Interconnect (PCI) Express (PCIe) protocol.

9. The device of claim 1, wherein the first auxiliary signal configuration includes at least one first code that indicates that the optical link is properly configured to transport data.

10. The device of claim 9, wherein the second auxiliary signal configuration includes at least one second code that indicates the optical link is improperly configured to transport data.

11. The device of claim 10, wherein the transmitter comprises a plurality of channels and a plurality of drivers corresponding to the plurality of channels, wherein the controller selectively enables and disables at least one driver output of the plurality of drivers to generate the at least one first code and the at least one second code.

12. The device of claim 11, wherein the at least one first code is a member of a first code set, wherein the first code set includes a first plurality of binary codes.

13. The device of claim 12, wherein the first plurality of binary codes comprises at least one of 0000, 0001, 0011, 1000, 1100, and 1111.

14. The device of claim 10, wherein the at least one second code is a member of a second code set, wherein the second code set includes a second plurality of binary codes.

15. The device of claim 14, wherein the second plurality of binary codes comprises at least one of 1001, 1011, 1101, and 1110.

16. The device of claim 15, wherein the second plurality of binary codes further comprises at least one of 0111, 0110, 0010, 0100, 0101, and 1010.

17. The device of claim 15, wherein the one or more first auxiliary signals and the one or more second auxiliary signals are auxiliary signals of a Peripheral Component Interconnect (PCI) Express (PCIe) protocol.

18. The device of claim 17, wherein the binary code 1001 corresponds to a platform reset signal in a low logic state and a power on signal in a low logic state.

19. The device of claim 17, wherein the binary code 1011 corresponds to a platform reset signal in a low logic state and a power on signal in a high logic state.

20. The device of claim 17, wherein the binary code 1101 corresponds to a platform reset signal in a high logic state and a power on signal in a low logic state.

21. The device of claim 17, wherein the binary code 1110 corresponds to a platform reset signal in a high logic state and a power on signal in a high logic state.

22. The device of claim 17, wherein the binary code 1001 corresponds to a present signal in a low logic state and a wake signal in a low logic state.

23. The device of claim 17, wherein the binary code 1011 corresponds to a present signal in a low logic state and a wake signal in a high logic state.

24. The device of claim 17, wherein the binary code 1101 corresponds to a present signal in a high logic state and a wake signal in a low logic state.

25. The device of claim 17, wherein the binary code 1110 corresponds to a present signal in a high logic state and a wake signal in a high logic state.

26. The device of claim 1, wherein the one or more first auxiliary signals and the one or more second auxiliary signals are auxiliary signals of a Peripheral Component Interconnect (PCI) Express (PCIe) protocol.

27. The device of claim 26, wherein the one or more first auxiliary signals and the one or more second auxiliary signals include at least one of a present signal, a wake signal, a platform reset signal, and a power on signal.

28. The device of claim 27, wherein the present signal is transmitted by a device to indicate the device is present on the optical link, wherein the wake signal is transmitted by a device to command a receiving device to awaken, wherein the platform reset signal is transmitted by a device to indicate a power state and a reset state of the device, wherein the power on signal is transmitted by a host to notify a target that host power is present.

29. The device of claim 27, wherein the first auxiliary signals include the present signal and the wake signal, and the second auxiliary signals comprise the platform reset signal and the power on signal.

30. The device of claim 27, wherein the first auxiliary signals include the platform reset signal and the power on signal, and the second auxiliary signals comprise the present signal and the wake signal.

31. The device of claim 1, wherein the first state comprises a state in which one or more outputs of the transmitter is enabled and one or more outputs of the receiver is enabled.

32. The device of claim 31, wherein, in the second state, the one or more outputs of the transmitter is selectively enabled and disabled, the one or more outputs of the receiver is disabled, one or more internal squelches coupled to each of one or more receiver output channels is selectively enabled and disabled, and monitoring for light at one or more inputs of the receiver is enabled.

33. The device of claim 1, wherein the transmitter comprises one or more channels and one or more drivers, wherein each channel of the one or more channels includes a driver of the one or more drivers.

34. The device of claim 33, further comprising a detector coupled between an input of at least one of the one or more drivers and the controller, wherein the detector measures a parameter of one of the one or more first data signals present at the input and outputs a detector signal representative of the parameter.

35. The device of claim 34, wherein the controller compares the detector signal to a reference and uses the result of the comparison to determine when a data signal is present at the input of the at least one of the one or more drivers.

36. The device of claim 35, further comprising a driver control signal coupled between the controller and the at least one of the one or more drivers, wherein the controller via the driver control signal enables at least one driver output of the at least one of the one or more drivers when the data signal is detected at the input of the transmitter.

37. The device of claim 36, wherein the controller, when the at least one driver output is disabled, enables the at least one driver output by writing ahead an initial portion of the driver control signal, and writing a final portion of the driver control signal when the data signal is detected at the input of the transmitter.

38. The device of claim 36, wherein the controller via the driver control signal disables the at least one driver output when the data signal is detected as absent at the input of the at least one of the one or more drivers.

39. The device of claim 38, wherein the controller disables the at least one driver output by toggling at least one bit of the driver control signal in violation of a driver control signal protocol, wherein no light is transmitted over the optical channel when the at least one driver output is disabled.

40. The device of claim 36, wherein the controller disables the at least one driver output when the controller detects at the receiver an absence of light received over the optical link.

41. The device of claim 38, wherein the receiver enables at least one internal squelch of at least one receiver output channel when an absence of light is detected on a corresponding channel of the optical link.

42. The device of claim 1, wherein the first state comprises a plurality of sub-states.

43. The device of claim 42, wherein a first sub-state is a data-idle state in which the one or more first data signals are absent at one or more inputs of the transmitter, wherein no data is transmitted over the optical link during the data-idle state.

44. The device of claim 43, wherein, in the data-idle state one or more outputs of the transmitter is disabled, one or more outputs of the receiver is enabled, one or more internal squelches coupled to each of one or more receiver output channels is enabled, and the one or more first data signals at the one or more inputs of the transmitter is monitored.

45. The device of claim 43, wherein a second sub-state is a data-active state in which the one or more first data signals are detected at the one or more inputs of the transmitter.

46. The device of claim 45, wherein the data-active state comprises a state in which an output of the transmitter is enabled and an output of the receiver is enabled.

47. A device comprising:

an optical link including optical channels;

a transmitter coupled to the optical link; and a controller coupled to the transmitter; wherein a first auxiliary signal configuration is defined by values of one or more auxiliary signals;

a second auxiliary signal configuration is defined by other values of the one or more auxiliary signals; and when the device is on, the controller controls:

when the controller detects the first auxiliary signal configuration, the transmitter in a first state in which the transmitter is controlled to be capable of transmitting one or more first data signals;

when the controller detects the second auxiliary signal configuration, the transmitter in a second state in which data transmission is disabled; and the transmitter to continuously transmit the one or more auxiliary signals over the optical link in the first and the second states.

48. A device comprising:

an optical link including optical channels;

a receiver coupled to the optical link; and a controller coupled to the receiver; wherein a first auxiliary signal configuration is defined by values of one or more first auxiliary signals;

a second auxiliary signal configuration is defined by other values of the one or more auxiliary signals; and when the device is on, the controller controls:

when the controller detects the first auxiliary signal configuration, the receiver in a first state in which the receiver is controlled to be capable of receiving one or more data signals;

when the controller detects the second auxiliary signal configuration, the receiver in a second state in which data reception is disabled; and the receiver to continuously receive the one or more auxiliary signals over the optical link in the first and the second states.

* * * * *